(12) United States Patent
Hoshi et al.

(10) Patent No.: US 10,794,321 B2
(45) Date of Patent: Oct. 6, 2020

(54) ESTIMATION DEVICE AND CONTROL DEVICE FOR COMBUSTION SYSTEM

(71) Applicant: DENSO CORPORATION, Kariya, Aichi-pref. (JP)

(72) Inventors: Shinya Hoshi, Kariya (JP); Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 15/773,590

(22) PCT Filed: Sep. 13, 2016

(86) PCT No.: PCT/JP2016/076879
§ 371 (c)(1),
(2) Date: May 4, 2018

(87) PCT Pub. No.: WO2017/081931
PCT Pub. Date: May 18, 2017

(65) Prior Publication Data
US 2018/0320627 A1    Nov. 8, 2018

(30) Foreign Application Priority Data

Nov. 12, 2015 (JP) ................. 2015-222313

(51) Int. Cl.
*F02D 41/38* (2006.01)
*F02D 41/40* (2006.01)
(Continued)

(52) U.S. Cl.
CPC ............. *F02D 41/38* (2013.01); *F02D 19/00* (2013.01); *F02D 19/0636* (2013.01);
(Continued)

(58) Field of Classification Search
CPC ........ F02D 41/38; F02D 41/047; F02D 35/02; F02D 19/0636; F02D 41/401;
(Continued)

(56) References Cited

U.S. PATENT DOCUMENTS

2008/0243358 A1    10/2008 Kojima et al.
2010/0012081 A1    1/2010 Ashizawa
(Continued)

FOREIGN PATENT DOCUMENTS

JP       4122870       7/2008
JP    2012-241638    12/2012

OTHER PUBLICATIONS

U.S. Appl. No. 15/773,578 of Hoshi, et al., filed May 4, 2018, entitled Estimation Device and Control Device for Combustion System (72 pages).
(Continued)

*Primary Examiner* — Joseph J Dallo
*Assistant Examiner* — Scott A Reinbold
(74) *Attorney, Agent, or Firm* — Nixon & Vanderhye, P.C.

(57) ABSTRACT

An estimation device is applicable to a combustion system including an internal combustion engine and includes a mixing acquisition unit, a main region estimation unit, and an after region estimation unit. The mixing acquisition unit acquires a mixing ratio of various components contained in the fuel used for combustion in the internal combustion engine. The main region estimation unit estimates a combustion region of the fuel as a main combustion region for a main combustion produced by injecting the fuel into a combustion chamber of the internal combustion engine by main injection, based on the mixing ratio acquired by the mixing acquisition unit. The after region estimation unit estimates an injection region of the fuel as the after com-
(Continued)

bustion region based on the mixing ratio, for an after combustion produced by injecting the fuel into the combustion chamber by an after injection, after the main injection in one combustion cycle.

9 Claims, 15 Drawing Sheets

(51) Int. Cl.
    *F02D 19/06*     (2006.01)
    *F02D 35/02*     (2006.01)
    *F02D 41/04*     (2006.01)
    *F02D 19/00*     (2006.01)
    *F02D 41/14*     (2006.01)

(52) U.S. Cl.
    CPC ............ *F02D 35/02* (2013.01); *F02D 41/047* (2013.01); *F02D 41/401* (2013.01); *F02D 41/405* (2013.01); *F02D 2041/1433* (2013.01); *F02D 2200/0602* (2013.01); *F02D 2200/0612* (2013.01); *F02D 2200/0616* (2013.01); *F02D 2200/0802* (2013.01)

(58) Field of Classification Search
    CPC .................. F02D 41/405; F02D 19/00; F02D 2200/0802; F02D 2200/0602; F02D 2200/0616; F02D 2041/1433; F02D 2200/0612

USPC ......................................................... 123/704
See application file for complete search history.

(56) References Cited

U.S. PATENT DOCUMENTS

2011/0088657 A1* 4/2011 Tanno ................... F02D 35/028
                                                                                             123/305
2015/0252745 A1    9/2015  Naruse et al.

OTHER PUBLICATIONS

U.S. Appl. No. 15/773,583 of Hoshi, et al., filed May 4, 2018, entitled Estimation Device and Control Device for Combustion System (52 pages).
U.S. Appl. No. 15/773,584 of Hoshi, et al., filed May 4, 2018, entitled Estimation Device and Control Device for Combustion System (66 pages).
U.S. Appl. No. 15/773,604 of Okabayashi, et al., filed May 4, 2018, entitled Combustion System Estimation Device and Control Device, (70 pages).
U.S. Appl. No. 15/773,625 of Hoshi, et al., filed May 4, 2018, Estimation Device and Control Device for Combustion System, (60 pages).

* cited by examiner

FIG. 3

$$
\begin{pmatrix} \text{MIXING AMOUNT OF LINEAR PARAFFINS} \\ \text{MIXING AMOUNT OF NAPHTHENES} \\ \text{MIXING AMOUNT OF SIDE CHAIN PARAFFINS} \\ \text{MIXING AMOUNT OF AROMATICS} \\ \cdots \end{pmatrix} = \begin{pmatrix} a_{00} & \cdots & a_{0Y} \\ \vdots & \ddots & \vdots \\ a_{X0} & \cdots & a_{XY} \end{pmatrix} \cdot \begin{pmatrix} \text{IGNITION DELAY TIME TD}(i) &: P(i), T(i), O_2(i), P_c(i) \\ \text{IGNITION DELAY TIME TD}(j) &: P(j), T(j), O_2(j), P_c(j) \\ \text{IGNITION DELAY TIME TD}(k) &: P(k), T(k), O_2(k), P_c(k) \\ \text{IGNITION DELAY TIME TD}(l) &: P(l), T(l), O_2(l), P_c(l) \\ \cdots & \end{pmatrix}
$$

MOLECULAR STRUCTURAL SPECIES | CONSTANTS | FLAMMABILITY PARAMETERS

FIG. 4
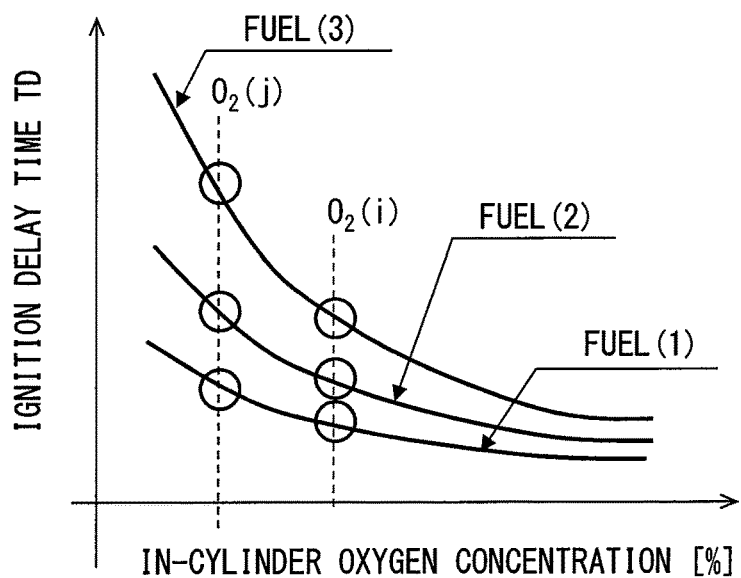
FIG. 5
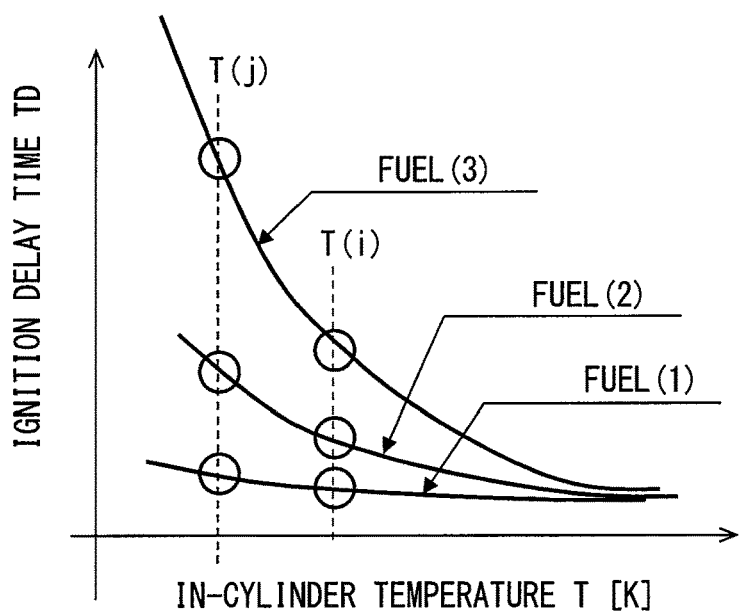
FIG. 6
|  | MOLECULAR STRUCTURE TYPE A | MOLECULAR STRUCTURE TYPE B | MOLECULAR STRUCTURE TYPE C |
|---|---|---|---|
| FUEL (1) | LARGE | LARGE | SMALL |
| FUEL (2) | SMALL | LARGE | SMALL |
| FUEL (3) | LARGE | SMALL | LARGE |

FIG. 12

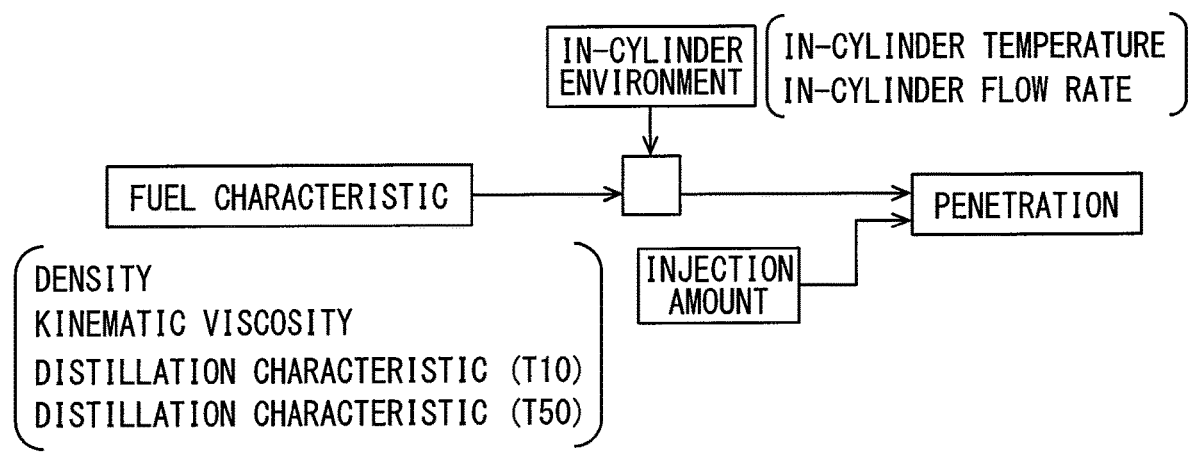

FIG. 13

$$\begin{pmatrix} \text{PENETRATION P1} \\ \text{PENETRATION P2} \\ \text{PENETRATION P3} \\ \cdots \end{pmatrix} = \begin{pmatrix} b_{00} & \cdots & b_{0Y} \\ \vdots & \ddots & \vdots \\ b_{X0} & \cdots & b_{XY} \end{pmatrix} \cdot \begin{pmatrix} \text{KINEMATIC VISCOSITY} \\ \text{DENSITY} \\ \text{DISTILLATION CHARACTERISTIC : T10} \\ \text{DISTILLATION CHARACTERISTIC : T50} \\ \cdots \end{pmatrix}$$

FIG. 14

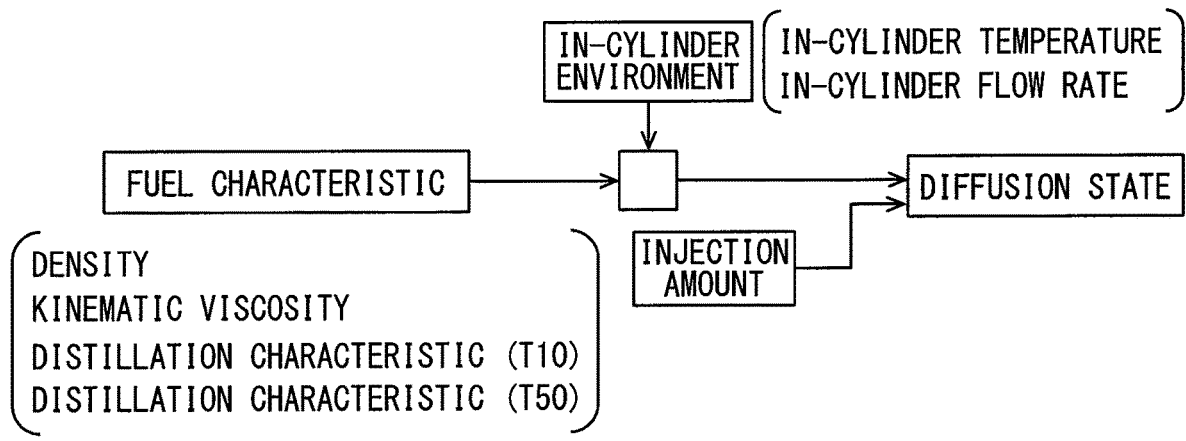

FIG. 15

$$\begin{pmatrix} \text{DIFFUSION STATE D1} \\ \text{DIFFUSION STATE D2} \\ \text{DIFFUSION STATE D3} \\ \cdots \end{pmatrix} = \begin{pmatrix} c_{00} & \cdots & c_{0Y} \\ \vdots & \ddots & \vdots \\ c_{X0} & \cdots & c_{XY} \end{pmatrix} \cdot \begin{pmatrix} \text{KINEMATIC VISCOSITY} \\ \text{DENSITY} \\ \text{DISTILLATION CHARACTERISTIC : T10} \\ \text{DISTILLATION CHARACTERISTIC : T50} \\ \cdots \end{pmatrix}$$

FIG. 16

$$\underbrace{Q_{burn}[\text{J}]}_{\substack{\text{COMBUSTION} \\ \text{AMOUNT}}} = \underbrace{\alpha\,[-]}_{\substack{\text{COMBUSTION} \\ \text{RATE}}} \cdot \underbrace{\rho\,[\text{g/mm}^3] \cdot Q_{inj}[\text{mm}^3/\text{st}]}_{\substack{\text{INJECTION} \\ \text{AMOUNT}}} \cdot \underbrace{A\,[\text{J/g}]}_{\substack{\text{LOWER} \\ \text{HEAT GENERATION} \\ \text{AMOUNT}}}$$

FIG. 17

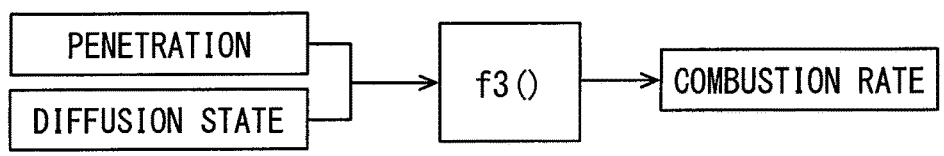

ESTIMATION DEVICE AND CONTROL DEVICE FOR COMBUSTION SYSTEM

CROSS REFERENCE TO RELATED APPLICATION

This application is the U.S. national phase of International Application No. PCT/JP2016/076879 filed Sep. 13, 2016, which designated the U.S. and claims priority to Japanese Patent Application No. 2015-222313 filed on Nov. 12, 2015, the entire contents of each of which are incorporated herein by reference.

TECHNICAL FIELD

The present disclosure relates to an estimation device to perform an estimation on fuel injection in a combustion system and a control device to perform a control on the combustion system.

BACKGROUND ART

Conventionally, a known technique for a combustion system having an internal combustion engine is multistage injection to inject a fuel into a combustion chamber for multiple times in one combustion cycle. When the multistage injection includes a main injection and an after injection, a smoke including a soot and the like produced by a main combustion caused by the main injection is oxidized by an after combustion caused by the after injection. In Patent Literature 1, for example, an injection rate and an injection timing of the fuel for the after injection are changed such that the fuel of the after injection does not enter a flame caused by the main injection. Thus, an incomplete combustion of the fuel of the after injection is restricted.

PRIOR ART LITERATURE

Patent Literature

Patent Literature 1: JP2012-241638A

However, a fuel having various properties exist as a fuel used for combustion in internal combustion engines. Thus, when components contained in the fuel differ from each other or when the mixing ratio of the components differs, a position relation between a combustion region caused by the main injection and the fuel injected by the after injection may be inappropriate even though the injection timing of the fuel is changed as the Patent Literature 1.

For example, when the penetration of the after injection becomes longer due to a property of the fuel, the fuel of the after injection is likely to enter the combustion region caused by the main injection. In this case, it is possible that the incomplete combustion of the fuel of the after injection occurs and the generation amount of the smoke caused by the after injection increases. When the penetration of the after injection becomes shorter due to the property of the fuel, the combustion region caused by the after injection is excessively far from the combustion region caused by the main injection, and it is unlikely that the smoke caused by the main combustion is oxidized by the after combustion. In this case, it is possible that the combustion amount caused by the fuel of the main injection decreases and the output of the internal combustion engine decreases.

SUMMARY OF INVENTION

It is an object of the present disclosure to produce an estimation device and a control device to enable to adjust an exhaust emission or an output of an internal combustion engine generated by an after injection.

According to a first mode of the present disclosure, an estimation device is applicable to a combustion system having an internal combustion engine and includes a mixing acquisition unit to acquire a mixing ratio of various components contained in fuel used for combustion in the internal combustion engine. The estimation device further includes a main region estimation unit to estimate a combustion region of the fuel as a main combustion region for a main combustion produced by injecting the fuel into a combustion chamber of the internal combustion engine by a main injection, based on the mixing ratio acquired by the mixing acquisition unit. The estimation device further includes an after region estimation unit to estimate an injection region of the fuel as the after combustion region based on the mixing ratio, for an after combustion produced by injecting the fuel into the combustion chamber by an after injection, after the main injection in one combustion cycle.

According to a second mode of the present disclosure, an estimation device is applicable to a combustion system having an internal combustion engine and includes a mixing acquisition unit to acquire a mixing ratio of various components contained in fuel used for combustion in the internal combustion engine. The estimation device further includes a main penetration force estimation unit to estimate a penetration force of the fuel injected into a combustion chamber of the internal combustion engine by a main injection, based on the mixing ratio acquired by the mixing acquisition unit. The estimation device further includes an after penetration force estimation unit to estimate a penetration force of the fuel injected into the combustion chamber by the after injection, based on the mixing ratio, after the main injection in one combustion cycle.

According to a third mode of the present disclosure, a control device is applicable to a combustion system having an internal combustion engine and includes a mixing acquisition unit to acquire a mixing ratio of various components contained in fuel used for combustion in the internal combustion engine. The control device further includes a main region estimation unit to estimate a combustion region of the fuel as a main combustion region for a main combustion produced by injecting the fuel into a combustion chamber of the internal combustion engine by a main injection, based on the mixing ratio acquired by the mixing acquisition unit. The control device further includes an after region estimation unit to estimate an injection region of the fuel as the after combustion region based on the mixing ratio, for an after combustion produced by injecting the fuel into the combustion chamber by an after injection, after the main injection in one combustion cycle. The control device further includes a combustion control unit to control the combustion system based on respective estimation results of the main region estimation unit and the after region estimation unit.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram illustrating a relationship among multiple ignition delay times, parameters representing flammability, and mixing amounts of various components;

FIG. 4 is a diagram showing a relationship between a characteristic line representing a change in the ignition delay time caused due to an in-cylinder oxygen concentration and a molecular structural species of a fuel;

FIG. 5 is a diagram showing a relationship between the characteristic line representing a change in the ignition delay time caused due to an in-cylinder temperature and a molecular structural species of the fuel;

FIG. 6 is a view showing a relationship between a characteristic line specified based on an ignition delay time and a mixing ratio of a molecular structural species;

FIG. 12 is a diagram illustrating estimation of the penetration as an injection parameter;

FIG. 13 is a diagram showing a formula for estimating the penetration;

FIG. 14 is a diagram illustrating estimation of a diffusion state as the injection parameter;

FIG. 15 is a diagram showing a formula for estimating the diffusion state;

FIG. 16 is a diagram showing a formula for estimating a combustion amount as the combustion parameter;

FIG. 17 is a diagram showing a formula for estimating a combustion rate;

DESCRIPTION OF EMBODIMENTS

Figure 1:
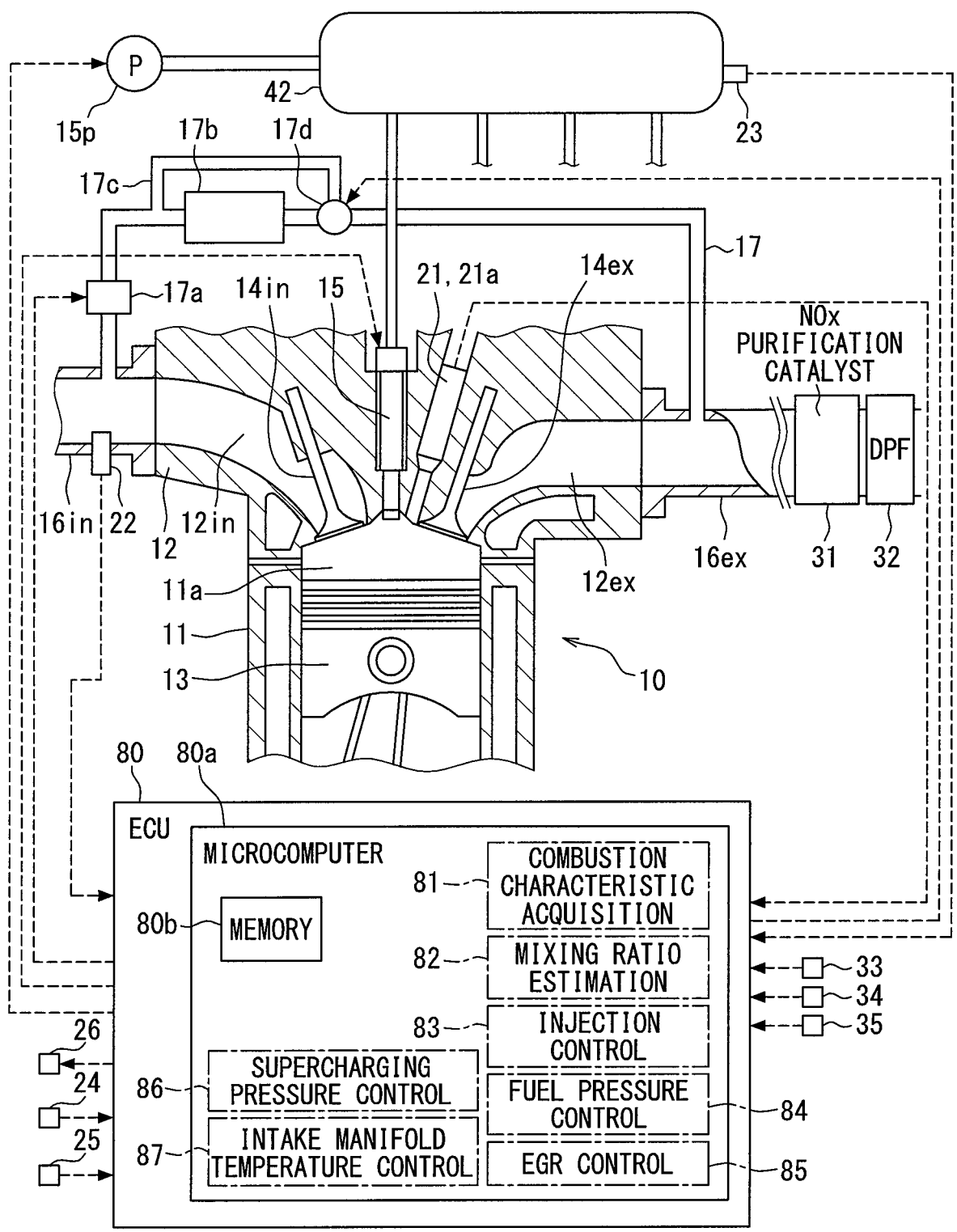
FIG. 1 is a schematic diagram of a combustion system according to a first embodiment.

Multiple embodiment for inventing referring to an As follows, drawing is described. In the following description of the embodiments, the same reference numerals will be used to refer to the same and already described elements and description thereof will be omitted in some cases. When only a part of a configuration in each embodiment is changed, the other parts of the configuration can be configured as the same as a prior embodiment.

First Embodiment

An estimation device and a control device for a combustion system according to the present embodiment are produced with an electronic control device (ECU 80) shown in FIG. 1. The ECU 80 includes a microcomputer (microcomputer 80*a*), an input processing circuit, an output processing circuit, and the like (none shown). The microcomputer 80*a* includes a central processing unit (CPU) not shown and a memory 80*b*. The CPU executes a predetermined program stored in the memory 80*b*, thereby to cause the microcomputer 80*a* to control the operation of a fuel injection valve 15, a fuel pump 15*p*, an EGR valve 17*a*, a temperature control valve 17*d*, and a supercharging pressure regulator 26 and the like included in the combustion system. Under those controls, a combustion state of the internal combustion engine 10 in the combustion system is controlled in a desired state. The combustion system and the ECU 80 are mounted in a vehicle, and the vehicle travels with the use of an output power of the internal combustion engine 10 as a driving source.

The internal combustion engine 10 includes a cylinder block 11, a cylinder head 12, a piston 13, and the like. An intake valve 14*in*, an exhaust valve 14*ex*, a fuel injection valve 15, and an in-cylinder pressure sensor 21 are equipped to the cylinder head 12.

The fuel pump 15*p* pumps a fuel in the fuel tank to a common rail 15*c*. The ECU 80 controls the operation of the fuel pump 15*p*, as a result of which the fuel in the common rail 15*c* is stored in the common rail 15*c* in a state where the fuel is maintained at a target pressure Ptrg. The common rail 15*c* distributes the accumulated fuel to the fuel injection valves 15 of the respective cylinders. The fuel injected from the fuel injection valve 15 mixes with an intake air in the combustion chamber 11*a* to form an air-fuel mixture, and the air-fuel mixture is compressed by the piston 13 and self-ignited. In short, the internal combustion engine 10 is a compression self-ignition type diesel engine, and a light oil is used as the fuel. Incidentally, as the fuel injection by the fuel injection valve 15, there is spray spraying the fuel in the form of mist.

The fuel injection valve 15 is configured by accommodating an electromagnetic actuator and a valve body inside a body. When the ECU 80 causes the energization of the electromagnetic actuator, an electromagnetic attraction force of the electromagnetic actuator causes a leak passage of a back pressure chamber (not shown) to open. The valve body opens in association with a reduction in the back pressure, and an injection hole provided in the body is opened. Thus, the fuel is injected from the injection hole. When the energization is turned off, the valve body is closed and the fuel injection is stopped.

An intake pipe 16*in* and an exhaust pipe 16*ex* are connected to an intake port 12*in* and an exhaust port 12*ex*, which are provided in the cylinder head 12, respectively. An EGR pipe 17 is connected to the intake pipe 16*in* and the exhaust pipe 16*ex*. A part (EGR gas) of the exhaust gas flows (returns) to the intake pipe 16*in* through the EGR pipe 17. An EGR valve 17*a* is equipped to the EGR pipe 17. The ECU 80 controls the operation of the EGR valve 17*a*, thereby to control an opening degree of the EGR pipe 17, and to control a flow rate of the EGR gas.

Furthermore, an EGR cooler 17*b* for cooling the EGR gas, a bypass pipe 17*c*, and a temperature control valve 17*d* are equipped to an upstream portion of the EGR valve 17a of the EGR pipe 17. The bypass pipe 17c defines a bypass flow channel that causes the EGR gas to bypass the EGR cooler 17b. The temperature control valve 17d adjusts the opening degree of the bypass flow channel, thereby to adjust a ratio between the EGR gas flowing through the EGR cooler 17b and the EGR gas flowing through the bypass flow channel, and finally to adjust a temperature of the EGR gas flowing into the intake pipe 16in. In this example, the intake air flowing into the intake port 12in contains an external air (fresh air) flowing from the intake pipe 16in and the EGR gas. Therefore, the adjustment of the temperature of the EGR gas with the temperature control valve 17d represents the adjustment of the temperature (intake manifold temperature) of the intake air flowing into the intake port 12in.

The combustion system is provided with a supercharger not shown. The supercharger has a turbine that is attached to the exhaust pipe 16ex and a compressor that is attached to the intake pipe 16in. When the turbine rotates due to a flow energy of the exhaust gas, the compressor rotates by the rotational force of the turbine, and the fresh air is compressed (supercharged) by the compressor. The supercharging pressure regulator 26 described above is a device for changing a capacity of the turbine. The ECU 80 controls the operation of the supercharging pressure regulator 26 to adjust the turbine capacity, thereby to control a supercharging pressure caused by the compressor.

In addition, the combustion system includes a NOx purification catalyst 31 and a DPF 32. The NOx purification catalyst 31 includes an adsorption catalyst that adsorbs nitrogen oxide NOx in the exhaust gas, a reduction catalyst that reduces NOx to nitrogen $N_2$, and the like. The DPF 32 (Diesel Particulate Filter) is a fine particle collecting device that is located in the further downstream side of the NOx purification catalyst 31, and collects fine particles contained in the exhaust gas. The exhaust gas flowing through the exhaust pipe 16ex passes through both of the NOx purification catalyst 31 and the DPF 32 and is subsequently discharged from a downstream end of the exhaust pipe 16ex. In the combustion system, the NOx purification catalyst 31 and the DPF 32 configure an exhaust gas purification device.

The ECU 80 receives detection signals from various sensors such as the in-cylinder pressure sensor 21, an oxygen concentration sensor 22, a rail pressure sensor 23, a crank angle sensor 24, an accelerator pedal sensor 25, an exhaust gas temperature sensor 33, an exhaust gas pressure sensor 34, and a catalyst temperature sensor 35.

The in-cylinder pressure sensor 21 outputs a detection signal corresponding to a pressure (in-cylinder pressure) of the combustion chamber 11a. The in-cylinder pressure sensor 21 has a temperature detection element 21a in addition to the pressure detection element, and outputs a detection signal corresponding to a temperature (in-cylinder temperature) of the combustion chamber 11a. The oxygen concentration sensor 22 is equipped to the intake pipe 16in and outputs a detection signal corresponding to an oxygen concentration in the intake air. The intake air to be detected is a mixture of fresh air and EGR gas. The rail pressure sensor 23 is equipped to the common rail 15c and outputs a detection signal corresponding to the pressure (rail pressure) of the accumulated fuel. The crank angle sensor 24 outputs a detection signal corresponding to the rotational speed (engine speed) of the crankshaft that is rotationally driven by the piston 13. The accelerator pedal sensor 25 outputs a detection signal corresponding to the depression amount (engine load) of an accelerator pedal depressed by a vehicle driver.

The exhaust gas temperature sensor 33 is equipped to the exhaust pipe 16ex, and detects an exhaust gas temperature. The exhaust gas pressure sensor 34 is equipped to the exhaust pipe 16ex, and detects an exhaust gas pressure. The exhaust gas temperature sensor 33 and the exhaust gas pressure sensor 34 are located between the NOx purification catalyst 31 and the turbine in the exhaust pipe 16ex.

The catalyst temperature sensor 35 is located between the NOx purification catalyst 31 and the DPF 32 in the exhaust pipe 16ex and detects an internal temperature of the NOx purification catalyst 31, thereby to detect the temperature of the exhaust gas that has passed through the NOx purification catalyst 31. The catalyst temperature sensor 35 may be equipped to the NOx purification catalyst 31.

The ECU 80 controls operations of the fuel injection valve 15, the fuel pump 15p, the EGR valve 17a, the temperature control valve 17d, and the supercharging pressure regulator 26, based on the respective detection signals of the sensors 21 to 25 and 33 to 35. In this way, a fuel injection start timing, the injection amount, an injection pressure, an EGR gas flow rate, an intake manifold temperature and a supercharging pressure are controlled.

While controlling the operation of the fuel injection valve 15, the microcomputer 80a functions as an injection control unit 83 to control the fuel injection start timing, the injection amount, and the number of injection stages related to the multistage injection. There is a case where the injection control is performed so that the same fuel injection valve 15 injects the fuel for multiple times (multistage injection) during one combustion cycle. The multiple injection include a main injection with the largest injection amount, a pilot injection performed at a timing before the main injection, an after injection performed at a timing after the main injection, and a post injection performed at a timing after the after injection.

While controlling the operation of the fuel pump 15p, the microcomputer 80a functions as a fuel pressure control unit 84 that controls the injection pressure. While controlling the operation of the EGR valve 17a, the microcomputer 80a functions as an EGR control unit 85 that controls the EGR gas flow rate. While controlling the operation of the temperature control valve 17d, the microcomputer 80a functions as an intake manifold temperature control unit 87 that controls the intake manifold temperature. While controlling the operation of the supercharging pressure regulator 26, the microcomputer 80a functions as a supercharging pressure control unit 86 that controls the supercharging pressure.

Figure 2:
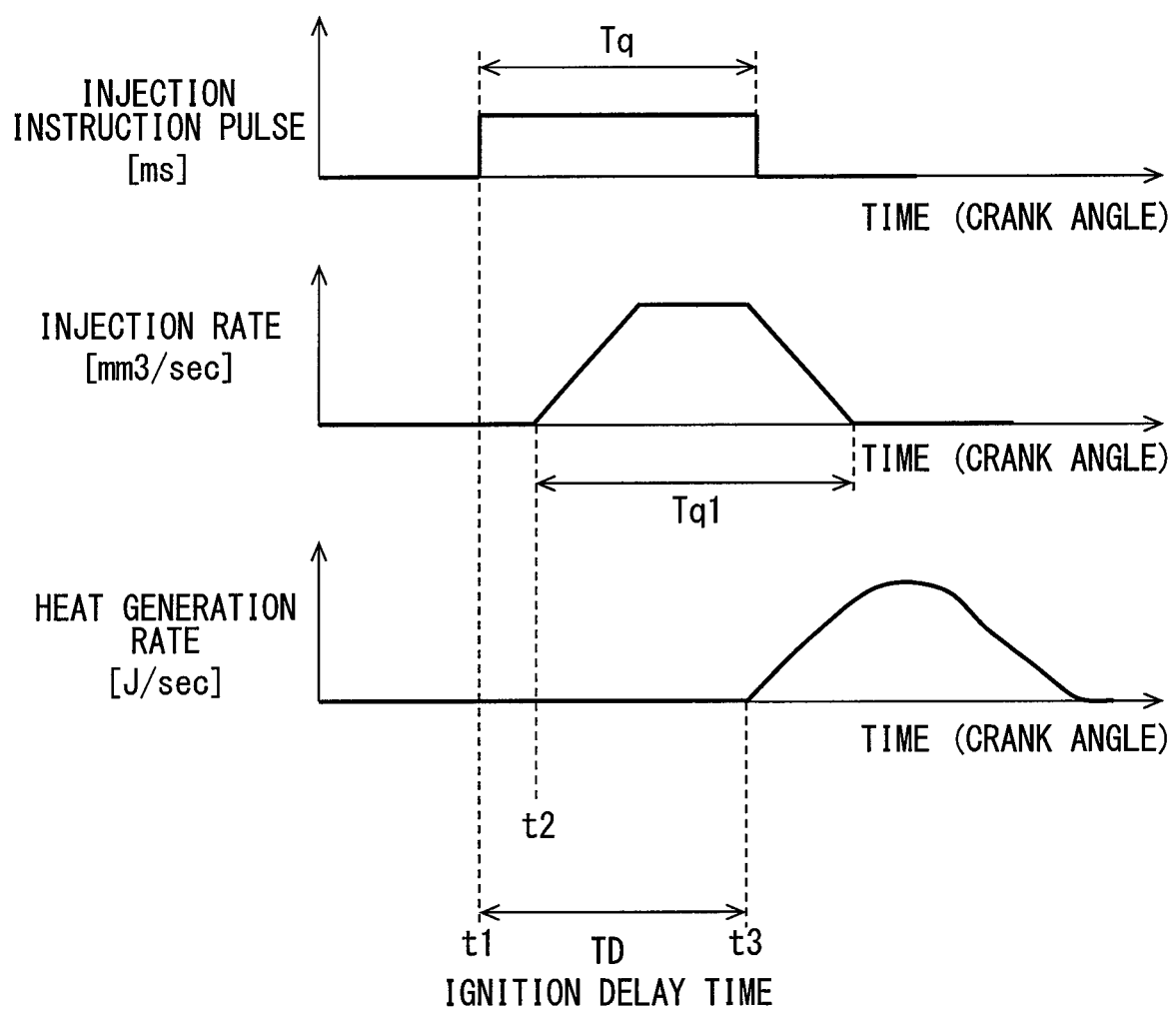
FIG. 2 is an illustrative diagram of an ignition delay time.

The microcomputer 80a also functions as a combustion characteristic acquisition unit 81 that acquires a detection value (combustion characteristic value) of a physical quantity relating to combustion. The combustion characteristic value according to the present embodiment represents an ignition delay time TD shown in FIG. 2. An upper part of FIG. 2 shows a pulse signal output from the microcomputer 80a. Energization of the fuel injection valve 15 is controlled according to the pulse signal. Specifically, the energization is started at a time point t1 when the pulse is on, and the energization continues in a pulse on period Tq. In short, the injection start timing is controlled according to the pulse on timing. In addition, the injection period is controlled according to the pulse on period Tq, and further, the injection amount is controlled.

A middle part of FIG. 2 shows a change in an injection state of the fuel from the injection hole, which results from the valve opening operation and the valve closing operation of the valve body according to the pulse signal. Specifically, the middle part of FIG. 2 shows a change in the injection amount (injection rate) of the fuel injected per unit time. As shown in the drawing, there is a time lag from the time point t1, when energization is started, to a time period t2 when the injection is actually started. There is also a time lag from an energization completion time point until the injection is actually stopped. A period Tq1 in which the injection is actually performed is controlled according to a pulse on period Tq.

A lower part of FIG. 2 shows a change in the combustion state of the injected fuel in the combustion chamber 11a. Specifically, the lower part of FIG. 2 shows a change in heat quantity (heat generation rate) per unit time caused by self-ignition combustion of a mixture of the injected fuel with the intake air. As shown in the drawing, there is a time lag from the time point t2 of the injection start to a time point t3 when the combustion actually starts. In the present embodiment, a time from the time point t1, at which the energization starts, to the time point t3, at which the combustion starts, is defined as an ignition delay time TD.

The combustion characteristic acquisition unit 81 estimates the time point t3, when the combustion starts, based on the change in the in-cylinder pressure detected with the in-cylinder pressure sensor 21. Specifically, during a period, in which a crank angle rotates by a predetermined amount, after the piston 13 has reached a top dead center, a timing at which the in-cylinder pressure suddenly rises is estimated as a combustion start timing (time point t3). The ignition delay time TD is calculated by the combustion characteristic acquisition unit 81 based on the estimation result. Further, the combustion characteristic acquisition unit 81 acquires various states (combustion conditions) at the time of combustion for each combustion. Specifically, the in-cylinder pressure, the in-cylinder temperature, the intake oxygen concentration, and the injection pressure are acquired as combustion conditions.

Those combustion conditions are parameters expressing a flammability of the fuel. The air-fuel mixture is more likely to self-ignite and likely to burn as the in-cylinder pressure immediately before the combustion is higher, as the in-cylinder temperature immediately before the combustion is higher, as the intake oxygen concentration is higher, and as the injection pressure is higher. As the in-cylinder pressure and the in-cylinder temperature just before the combustion, for example, a value detected at the time point t1 at which the energization of the fuel injection valve 15 is started may be used. The in-cylinder pressure is detected with the in-cylinder pressure sensor 21. The in-cylinder temperature is detected with the temperature detection element 21a. The intake oxygen concentration is detected with the oxygen concentration sensor 22. The injection pressure is detected with the rail pressure sensor 23. The combustion characteristic acquisition unit 81 stores the acquired ignition delay time TD in the memory 80b in association to the parameters (combustion conditions) related to the combustion.

The microcomputer 80a also functions as a mixing ratio estimation unit 82 to estimate the mixing ratio of the molecular structural species contained in the fuel based on the multiple combustion characteristic values detected under the different combustion conditions. For example, the microcomputer 80a substitutes the ignition delay time TD for each different combustion condition into a determinant shown in FIG. 3 to calculate the mixing amount of the molecular structural species. The microcomputer 80a divides each of the calculated mixing amounts by the total amount, thereby to calculate the mixing ratio of the molecular structural species.

A matrix on the left side of FIG. 3 has x rows and one column and includes x numbers. Those numerical values represent the mixing amounts of various components. The various components are classified according to the type of molecular structure. Types of molecular structure include linear paraffins, side chain paraffins, naphthenes and aromatics.

The matrix on the left side of the right side is x rows and y columns, and has numerical values such as a00 . . . aXY. Those numerical values are constants determined on the basis of tests conducted in advance. The matrix on the right side of the right hand is y row 1 column and has y numbers. Those numerical values are the ignition delay time TD acquired with the combustion characteristic acquisition unit 81. For example, a numerical value of a first row and a first column represents an ignition delay time TD(i) acquired under a combustion condition i set in a predetermined combination of the parameters, and a numerical value of a second row and the first column represents an ignition delay time TD(j) acquired under a combustion condition j. All of the parameters are set to different values between the combustion condition i and the combustion condition j. Symbols P(i), T(i), O2(i) and Pc(i) in FIG. 3 indicate the in-cylinder pressure, the in-cylinder temperature, the intake oxygen concentration, and the injection pressure under the combustion condition i, respectively. Symbols P(j), T(j), O2(j) and Pc(j) indicate the respective parameters under the combustion condition j.

Subsequently, a description will be made on a theory that the mixing amount of the molecular structural species can be calculated by substituting the ignition delay time TD for each combustion condition in the determinant of FIG. 3 with reference to FIGS. 4, 5, and 6.

As shown in FIG. 4, since the air-fuel mixture is more likely to self-ignite as the concentration of oxygen (in-cylinder oxygen concentration) contained in the air-fuel mixture related to the combustion is higher, the ignition delay time TD becomes shorter. Three solid lines (1), (2) and (3) in the drawing are characteristic lines showing the relationship between an in-cylinder oxygen concentration and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder oxygen concentration is O2(i), it can be estimated which molecular structural species is targeted. In particular, by comparing the ignition delay time TD in a case where the in-cylinder oxygen concentration is O2(i) with the ignition delay time TD in a case where the in-cylinder oxygen concentration is O2(j), the mixing ratio can be estimated with higher precision.

Similarly, as shown in FIG. 5, since the self-ignition tends to occur more easily as the in-cylinder temperature becomes higher, the ignition delay time TD becomes shorter. Three solid lines (1), (2) and (3) in the drawing are characteristic lines showing a relationship between the in-cylinder temperature and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder temperature is B1, it can be estimated which molecular structural species is targeted. In particular, by comparing the ignition delay time TD in a case where the in-cylinder temperature is T(i) with the ignition delay time TD in a case where the in-cylinder temperature is T(j), the mixing ratio can be estimated with higher precision.

Further, the molecular structural species highly influenced by the characteristic line relating to the in-cylinder oxygen concentration (refer to FIG. 4) is different from the molecular structural species highly influenced by the characteristic line relating to the in-cylinder temperature (refer to FIG. 5). As described above, the molecular structural species having a high degree of influence is different according to the characteristic lines relating to the respective multiple combustion conditions. Therefore, based on the combination of the ignition delay times TD obtained by setting the multiple parameters (combustion conditions) to different values, it can be estimated which of the molecular structural species has a high mixing ratio, for example, as shown in FIG. 6.

The molecular structural species A exemplified in FIG. 6 is a molecular structural species having a high degree of influence on the characteristic line (first characteristic line) related to the in-cylinder oxygen concentration (first parameter). In addition, the molecular structural species B is a molecular structural species having a high degree of influence on the characteristic line (second characteristic line) relating to the in-cylinder temperature (second parameter). The molecular structural species C is a molecular structural species having a high degree of influence on the characteristic line (third characteristic line) relating to the third parameter. The molecular structural species A is mixed more, as a change in the ignition delay time TD appears more with respect to a change in the first parameter. In a similar manner, the molecular structural species B are mixed more, as a change in the ignition delay time TD appears more with respect to a change in the second parameter. The molecular structural species B is mixed more, as a change in the ignition delay time TD appears more with respect to a change in the third parameter. Therefore, the mixing ratio of the molecular structural species A, B, C can be estimated for each of the different fuels (1), (2) and (3).

Subsequently, the processing of a program to be executed by the combustion characteristic acquisition unit 81 will be described. The processing is executed each time a pilot injection is commanded.

First, the combustion characteristic acquisition unit 81 estimates the time point t3 of the combustion start based on the detection value of the in-cylinder pressure sensor 21 as described above, and calculates the ignition delay time TD related to the pilot injection. Subsequently, the combustion characteristic acquisition unit 81 stores the ignition delay time TD in association with the multiple parameters (combustion conditions) in the memory 80b.

Specifically, a numerical range, in which the respective parameters can be, is divided into multiple regions in advance, and the combinations of regions of the multiple parameters are set in advance. For example, the ignition delay time TD(i) shown in FIG. 3 represents the ignition delay time TD acquired under the combination of the regions of P(i), T(i), O2(i), and Pc(i). Likewise, the ignition delay time TD(j) represents the ignition delay time TD acquired under the combination of the regions of P(j), T(j), O2(j), and Pc(j).

When it is highly likely that another fuel has been mixed with the fuel stored in the fuel tank due to refueling by a user, it is assumed that the mixing ratio of the molecular structural species has changed and an estimated value of the mixing amount is reset. For example, the estimated value of the mixing amount is reset when an increase in the remaining fuel level is detected by a sensor that detects the remaining fuel level in the fuel tank at the time of stopping the operation of the internal combustion engine 10.

The combustion characteristic acquisition unit 81 substitutes the ignition delay time TD into the determinant of FIG. 3 to calculate the mixing amount for each molecular structural species. The combustion characteristic acquisition unit 81 changes the number of columns of the matrix representing the constant according to the sampling number, that is, the number of rows of the matrix on the right side of the right member of the determinant. Alternatively, the combustion characteristic acquisition unit 81 substitutes a preset nominal value into the matrix of the ignition delay time TD with respect to the ignition delay time TD that has not been acquired. The combustion characteristic acquisition unit 81 calculates the mixing ratio for each molecular structural species based on the mixing amount, which is calculated in this manner for each molecular structural species.

As described above, the microcomputer 80a also functions as the injection control unit 83, the fuel pressure control unit 84, the EGR control unit 85, the supercharging pressure control unit 86, and the intake manifold temperature control unit 87. Those control units set target values on the basis of an engine speed, an engine load, an engine coolant temperature and the like and perform a feedback control so that a control target has a target value. Alternatively, those control units performs an open control according to contents corresponding to the target value.

The injection control unit 83 sets the pulse signal of FIG. 2 so that the injection start timing, the injection amount, and the injection stage number become the target values, thereby to control (injection control) the injection start timing, the injection amount, and the injection stage number. The number of injection stages is the number of injections pertaining to the multistage injection described above. Specifically, the injection control unit 83 stores an ON time (energization time) and a pulse ON rise timing (energization start timing) of the pulse signal corresponding to the target value on a map in advance. The injection control unit 83 acquires the energization time and energization start timing corresponding to the target value from the map and sets a pulse signal.

In addition, the injection control unit 83 stores the output torque generated by the injection, emission state values such as the NOx amount and the PM amount in advance. In setting the target value based on the engine speed, the engine load and the like in next and subsequent injections, the injection control unit 83 corrects the target value based on the values stored as described above. In short, the injection control unit 83 corrects the target value so as to make a deviation between the actual output torque or emission state value, and the desired output torque or emission state value zero, and performs the feedback control.

The fuel pressure control unit 84 controls the operation of a metering valve that controls a flow rate of the fuel drawn into the fuel pump 15p. More specifically, the fuel pressure control unit 84 feedback controls the operation of the metering valve based on the deviation between the actual rail pressure detected with the rail pressure sensor 23 and the target pressure Ptrg (target value). As a result, the discharge amount per unit time by the fuel pump 15p is controlled, and the actual rail pressure is kept at the target value under the control (fuel pressure control).

The EGR control unit 85 sets a target value of the EGR amount based on the engine speed, the engine load, and the like. The EGR control unit 85 controls the EGR amount while controlling (EGR control) the valve opening degree of the EGR valve 17a based on the target value. The supercharging pressure control unit 86 sets a target value of the supercharging pressure based on the engine speed, the engine load, and the like. The supercharging pressure control unit 86 controls the supercharging pressure while controlling (supercharging pressure control) the operation of the supercharging pressure regulator 26 based on the above target value. The intake manifold temperature control unit 87 sets a target value of the intake manifold temperature based on the outside air temperature, the engine speed, the engine load, and the like. The intake manifold temperature control unit 87 controls the intake manifold temperature while controlling (intake manifold temperature control) the valve opening degree of the temperature control valve 17*d* based on the above target value.

The microcomputer 80*a* functions as the injection control unit 83 thereby to execute an after control processing that performs a control for the after injection. Herein, the after control processing will be described with reference to the flowchart of FIG. 7. The above process is repeatedly executed in a predetermined cycle during the operation period of the internal combustion engine 10.

Figure 7:
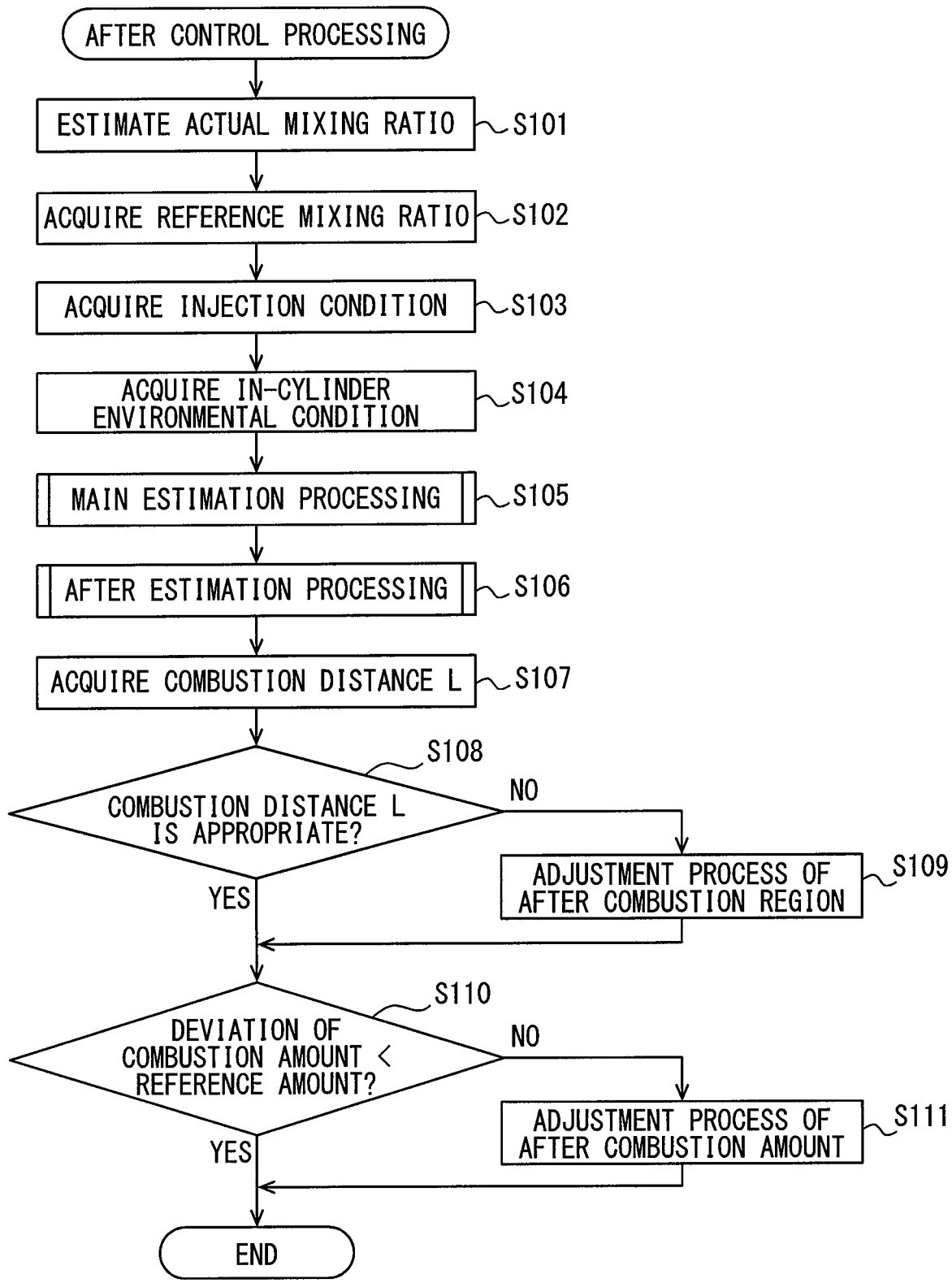
FIG. 7 is a flowchart showing a procedure of after control processing.

First, in step S101 of FIG. 7, the mixing ratio (an actual mixing ratio) estimated with the mixing ratio estimation unit 82 is acquired. In other words, the mixing ratio for each molecular structural species shown on the left side of FIG. 3 is acquired. On the other hand, a reference value (reference mixing ratio) of the mixing ratio for each molecular structural species is set in advance and stored in the memory 80*b*. Those reference mixing ratios are set in consideration of the fuel that is distributed in countries or regions where the vehicle device is used. Step S101 corresponds to a mixing acquisition unit. In step S102, the reference mixing ratio is read from the memory 80*b* and acquired.

In step S103, an injection condition on the fuel injection is acquired while the main injection and the after injection are targets. Examples of the injection conditions include a rail pressure, which is a fuel pressure in the common rail 15*c*, a target injection amount, which is a target value of the injection amount, an energization period for the fuel injection valve 15, a needle lift amount of the fuel injection valve 15, and the like. The rail pressure is an injection pressure under the combustion condition.

At step S104, in-cylinder environmental conditions when a fuel injection is performed are acquired while the main injection and the after injection are targets. Examples of the in-cylinder environmental conditions include the in-cylinder temperature, which is the temperature of the combustion chamber 11*a*, the in-cylinder oxygen concentration, which is the oxygen concentration of the combustion chamber 11*a*, the in-cylinder flow rate, which is the flow rate of the air-fuel mixture in the combustion chamber 11*a*. The in-cylinder temperature is also included in the combustion conditions. Further, the in-cylinder oxygen concentration is acquired based on the intake oxygen concentration included in the combustion conditions.

At step S105, main estimation processing is executed while the main injection is the target. The main estimation processing in step S105 will be described referring to the flowchart of FIG. 8. The combustion of the fuel performed by the main injection is referred to as a main combustion, and a state of the main combustion is referred to as a main combustion state. Even in a case where a fuel has the same property including the cetane number and the like, when the mixing ratio of the molecular structural species contained in the fuel differs, the main combustion state differs. In the combustion chamber 11*a*, when a smoke including a soot and the like is generated by the main combustion, it is more likely that the exhaust emission is deteriorated while the generation amount of the smoke becomes greater. Since the fuel is insufficiently combusted when the generation amount of the smoke is large, the output of the internal combustion engine 10 is likely to decrease. When the smoke is generated by the pilot injection, it is possible that the smoke is left after the main combustion.

Figure 8:
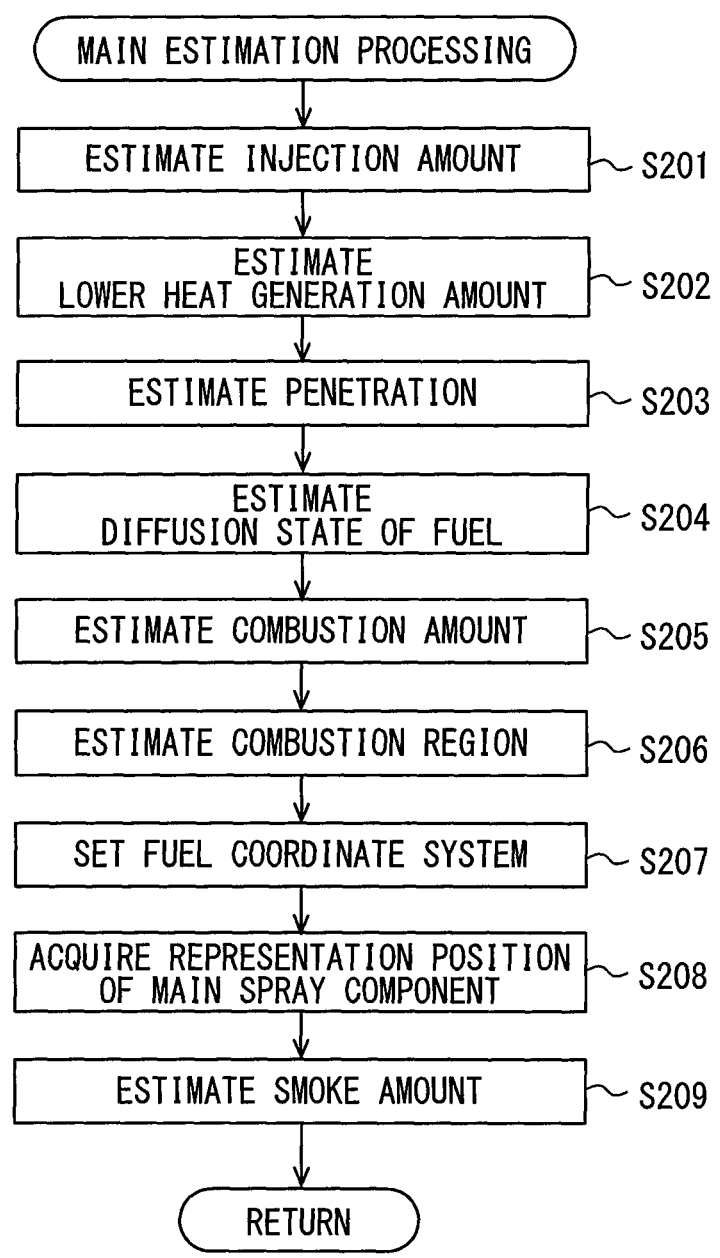
FIG. 8 is a flowchart showing a procedure of main estimation processing.

In FIG. 8, in steps S201 to S204, the injection state of the main injection is estimated according to the actual mixing ratio of the molecular structural species acquired in step S101. The injection parameter, which represents the injection state of the main injection, includes four parameters that are the injection amount, the lower heat generation amount, the penetration, and the diffusion state. For the reference fuel having the reference mixing ratio, the values of the respective injection parameters corresponding to the in-cylinder environment relating to the main injection are acquired in advance by conducting an experiment or the like, and those acquired data are stored in the memory 80*b* as reference data. For the actual fuel having the actual mixing ratio, the value of each injection parameter relating to the main injection is estimated with comparison with the reference data.

Figure 9:
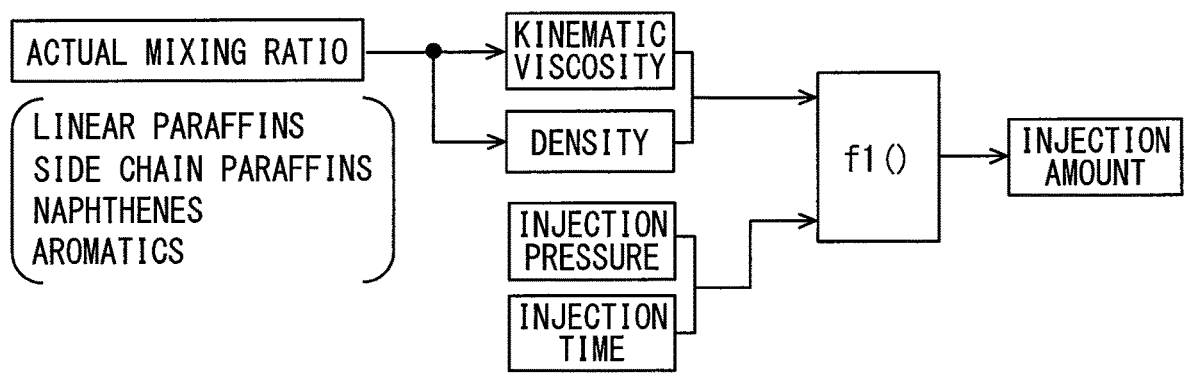
FIG. 9 is a diagram illustrating estimation of an injection amount as an injection parameter.

In step S201, the injection amount of the main injection is estimated based on the actual mixing ratio. In this example, as shown in FIG. 9, a kinematic viscosity and a density among the general properties of the fuel are estimated on the basis of the actual mixing ratio, and the injection amount is estimated with the use of a predetermined function f1( ) for the kinematic viscosity and the density as well as the injection pressure and the injection period of the injection conditions. In that case, the kinematic viscosity and the density are parts of the fuel characteristics, which are chemically affected, and the injection pressure and the injection period are parts of the use conditions and the environmental conditions, which are physically affected. Further, in the estimation of the injection amount, an estimation model such as a multiple regression model or a map may be used in place of the function f1 ( ). Furthermore, the pulse on period Tq may be used as the injection period. Step S201 corresponds to a main injection amount estimation unit.

Figure 10:
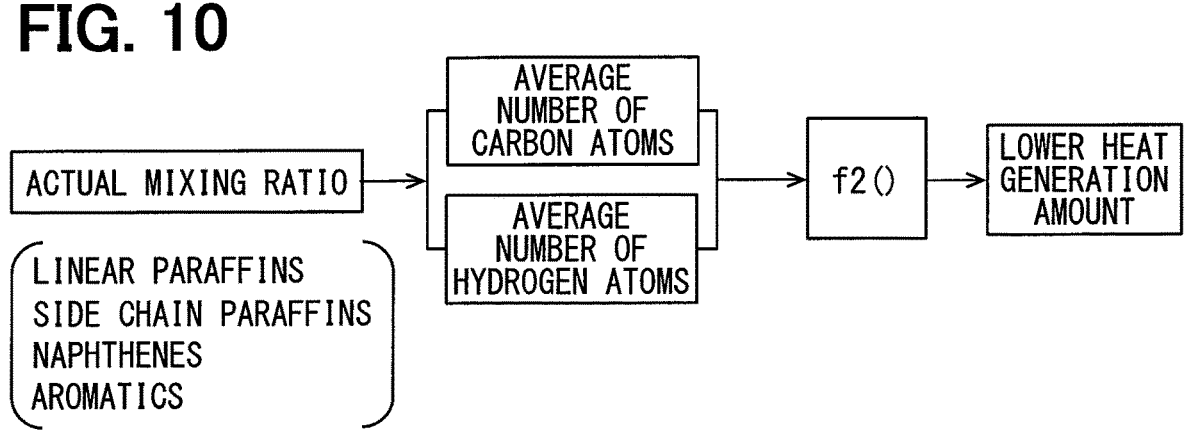
FIG. 10 is a diagram illustrating estimation of a lower heat generation amount as the injection parameter.

In step S202, the lower heat generation amount of the fuel is estimated based on the actual mixing ratio. In this example, as shown in FIG. 10, an average number of carbon atoms and an average number of hydrogen atoms of the fuel are estimated based on an actual mixing ratio, and the lower heat generation amount is estimated with the use of a predetermined function f20 for the average number of carbon atoms and the average number of hydrogen atoms. In this case, the average number of carbon atoms and the average number of hydrogen atoms are determined according to the fuel characteristics which are chemically affected. When the lower heat generation amount is estimated, an estimation model, a map, or the like may be used instead of the function f20. Incidentally, step S202 corresponds to a main heat-generation amount estimation unit.

In step S203, the penetration of the fuel injected by the main injection is estimated according to the actual mixing ratio. The penetration is a penetration force indicating a force by which the fuel injected from the fuel injection valve 15 goes straight through the combustion chamber 11*a*. The penetration of the injected fuel tends to decrease more, as an evaporation amount in the combustion chamber 11*a* increases more. Therefore, by estimating the volatility of the fuel based on the multiple distillation characteristics, the penetration of the fuel is estimated. Step S203 corresponds to a main penetration force estimation unit.

Figure 11:
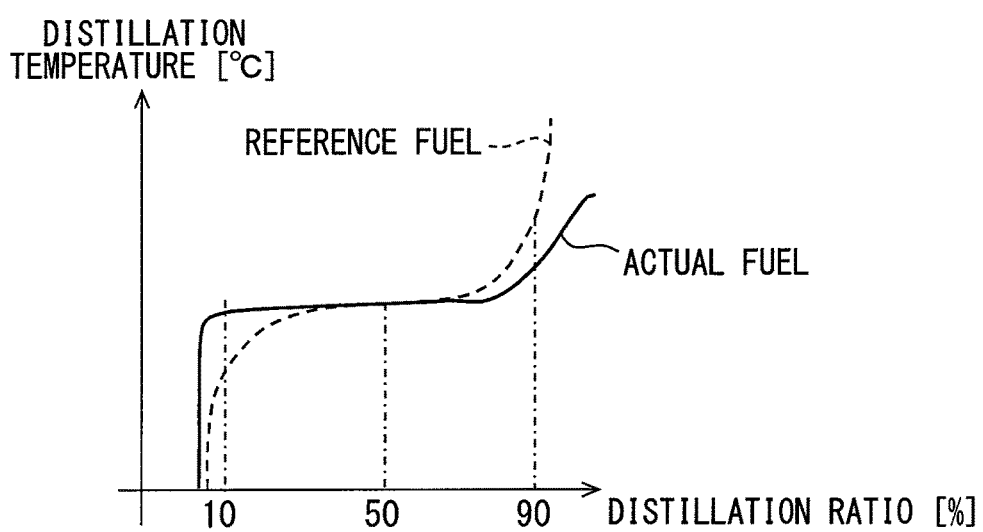
FIG. 11 is a diagram illustrating distillation characteristics.

As shown in FIG. 11, in the comparison between a reference fuel at a reference mixing ratio and an actual fuel at an actual mixing ratio, even in a case where the distillation characteristics T50, at which evaporating by 50%, are the same between the reference fuel and the actual fuel, the distillation characteristics T10 and T90 may be different between the reference fuel and the actual fuel. In that case, by estimating the penetration of the fuel based on the multiple distillation characteristics, the estimation precision can be increased.

In the fuel diffused in the combustion chamber 11a by being injected, a momentum becomes larger, as a mass of particles is larger, and the penetration tends to increase. In this case, the fuel having a higher kinematic viscosity and being less likely to be atomized tends to have a larger density, and the mass of the particles tends to increase. Further, the particles lose their mass more, as the volatility is higher, and the momentum becomes smaller. For example, a fuel at a low temperature from an initial boiling point of the distillation characteristics to a temperature T50 relatively trends to vaporize, and the penetration tends to be small.

In step S203, as shown in FIG. 12, the penetration is estimated based on the fuel characteristics including the density, the kinematic viscosity, and the multiple distillation characteristics, the in-cylinder environment including the in-cylinder temperature and the in-cylinder flow rate, and the injection amount estimated in step S201. The penetration is influenced by the in-cylinder environmental conditions and the injection conditions, and can be estimated with a mathematical formula as shown in FIG. 13. In the formula, penetration P1, P2, P3 . . . according to the in-cylinder environmental conditions and the injection conditions are estimated based on a predetermined constant b and the fuel characteristics such as the kinematic viscosity. The constant b includes x rows and y columns and is, for example, a matrix having numerical values b00 . . . bXY.

The distillation characteristics are estimated based on the actual mixing ratio contained in the fuel. For that reason, the fuel characteristics also include a factor of the actual mixing ratio in addition to general characteristics such as the density, the kinematic viscosity and the distillation characteristics.

Returning to FIG. 8, in step S204, the diffusion state of the fuel injected by the main injection is estimated according to the actual mixing ratio. The diffusion state is a degree of diffusion indicating how much the injected fuel diffuses. The injected fuel is likely to diffuse, as the evaporation amount in the combustion chamber 11a further increases. Therefore, as with the penetration, the volatility of the combustion is estimated based on the multiple distillation characteristics to estimate the diffusion state of the fuel. Incidentally, step S204 corresponds to a main diffusion estimation unit.

In step S204, as shown in FIG. 14, the diffusion state is estimated based on the fuel characteristics including the density, the kinematic viscosity, and the multiple distillation characteristics, the in-cylinder environment including the in-cylinder temperature and the in-cylinder flow rate, and the injection amount estimated in step S201. The diffusion state is influenced by the in-cylinder environmental conditions and the injection conditions, and can be estimated with a mathematical formula as shown in FIG. 15. In the formula, diffusion states D1, D2, D3 . . . according to the in-cylinder environmental conditions and the injection conditions are estimated based on a predetermined constant c and the fuel characteristics such as the kinematic viscosity. The constant c includes x rows and y columns, and is, for example, a matrix having numerical values c00 . . . cXY.

The diffusion state can also be calculated with the use of a well-known mathematical formula showing the momentum theory of spraying.

In steps S205 and S206, the main combustion state is estimated with the use of the injection parameters estimated in steps S201 to S204. The combustion parameters indicating the combustion state include two parameters including a combustion amount and a combustion region. In the reference fuel, the values of the respective combustion parameters corresponding to the in-cylinder environment relating to the main injection are acquired in advance by conducting an experiment or the like, and as with the injection parameters, those acquired data are stored in the memory 80b as the reference data. The actual fuel is compared with reference data relating to the main injection to estimate a value of each combustion parameter.

In step S205, the amount of combustion caused by the main injection is estimated. In the estimation of the combustion amount, all of the four injection parameters including the injection amount, the lower heat generation amount, the penetration, and the diffusion state are used. For example, the combustion amount is calculated with the use of a mathematical formula shown in FIG. 16. In the formula, Qburn represents the combustion amount, a represents the combustion rate, $\rho \times Q_{inj}$ represents the injection amount, which is estimated in step S201, and A represents the lower heat generation amount, which is estimated in step S202. As shown in FIG. 17, the combustion rate a is estimated with the use of a predetermined function f3( ) for the penetration estimated in step S203 and the diffusion state estimated in step S204. In addition, a spray volume of the main injection is also estimated with the use of the penetration and the diffusion state. Step S205 corresponds to a main combustion amount estimation unit. The combustion amount of the main combustion is referred to as a main combustion amount.

In step S206, the combustion region caused by the main injection is estimated. The combustion region corresponds to a position or a region where the combustion is caused by the fuel. Estimation of the combustion region uses three of the four injection parameters including the injection amount, the penetration, and the diffusion state. For example, the combustion region is estimated with the use of predetermined functions, maps, models, or the like on the injection amount, the penetration, and the diffusion state. Step S206 corresponds to a main region estimation unit. The combustion region of the main combustion is referred to as a main combustion region.

Figure 18:
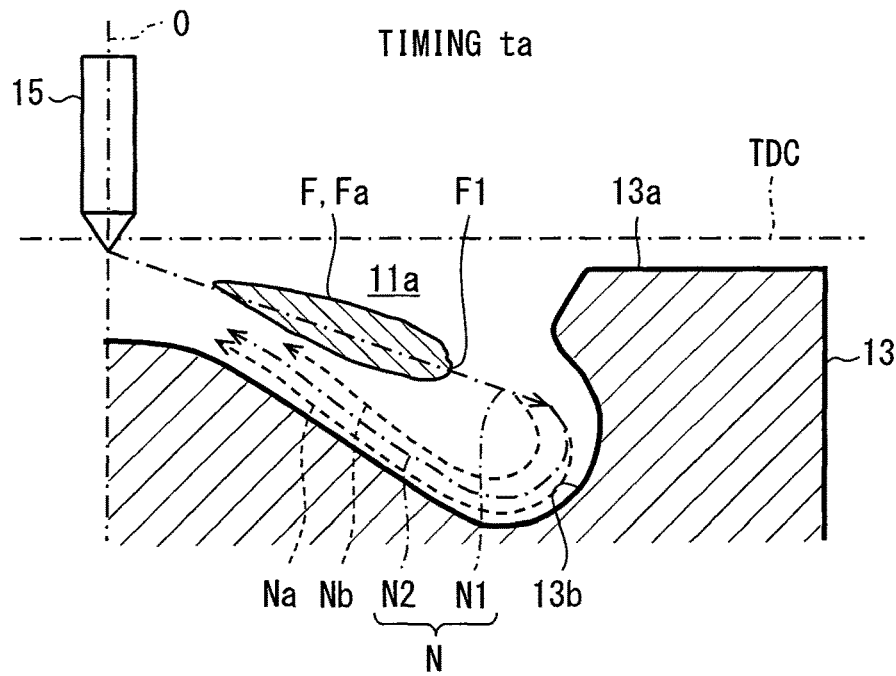
FIG. 18 is a diagram showing a fuel coordinate system.

In step S207, a coordinate system indicating a position of the fuel injected from the fuel injection valve 15 as a fuel coordinate system is set, based on the actual mixing ratio. Step S207 corresponds to a coordinate setting unit. As shown in FIG. 18, a cavity 13b that is a depression part is on an upper end surface 13a of the piston 13. The combustion chamber 11a has the inner space of the cavity 13b. The fuel injection valve 15 is located at the center position of the piston 13 in the width direction. In this case, in a width direction of the piston 13, a separation distance between a center line O of the fuel injection valve 15 and an inner peripheral surface of the cylinder 19 is substantially a half of a bore radius of the piston 13.

The fuel coordinate system includes a travel axis N extending in a travel direction of the fuel injected from the fuel injection valve 15. The fuel injected from the fuel injection valve 15 becomes a spray that is spray shaped in a spray component in the combustion chamber 11a. The travel axis N is at a position where it is assumed that a tip end part of the spray component passes in a direction in which the spray component extends. At the timing of executing the main injection, it is unlikely that the ignition delay is generated due to a condition that the in-cylinder temperature becomes sufficiently high. The spray component caused by the main injection is referred to as a main spray component F. The main spray component F almost defines the main combustion region. The shape and the position of the main spray component F are estimated while the main combustion region is estimated.

The travel axis N is set based on the injection amount, the lower heat generation amount, the penetration, and the diffusion state. In the combustion chamber 11a, the kinematic viscosity of the fuel, the density of the fuel and the like depend on the in-cylinder environment, and a dependent degree is determined by the actual mixing ratio. Thus, the kinematic viscosity and the density in the combustion chamber 11a are acquired based on the actual mixing ratio. The travel axis N is set by considering a behavior of the main spray component F or a behavior of an after spray component G, while the travel axis N is set by considering the acquisition result of the kinematic viscosity and the density.

The travel axis N includes a straight-line axis part N1 that extends from the center line O of the fuel injection valve 15 along an axial line of the injection hole and a curved-line axis part N2 that is bent along an inner peripheral surface of the cavity 13b. At the timings where the main injection and the after injection are performed, the piston 13 is in the vicinity of the top dead center TDC, and the straight-line axis part N1 extends towards the inner peripheral surface of the cavity 13b. The curved-line axis part N2 is separated from the inner peripheral surface of the cavity 13b. In the travel axis N, the straight-line axis part N1 and the curved-line axis part N2 are connected with each other at a junction part where the straight-line axis part N1 and the curved-line axis part N2 intersect each other. In this case, the travel axis N is shaped that the straight-line axis part N1 extends in a direction to separate from the fuel injection valve 15 and the curved-line axis part N2 extends in a direction toward the fuel injection valve 15.

Figure 21:
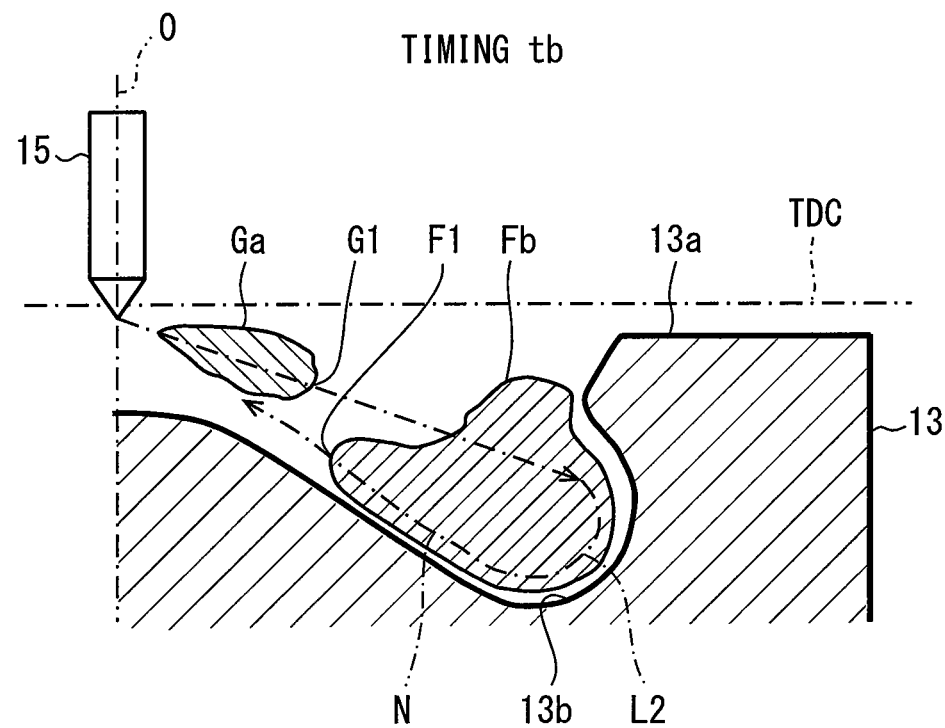
FIG. 21 is a diagram showing a position relation between a main spray component Fb and the after spray component Ga at a timing tb.
Figure 22:
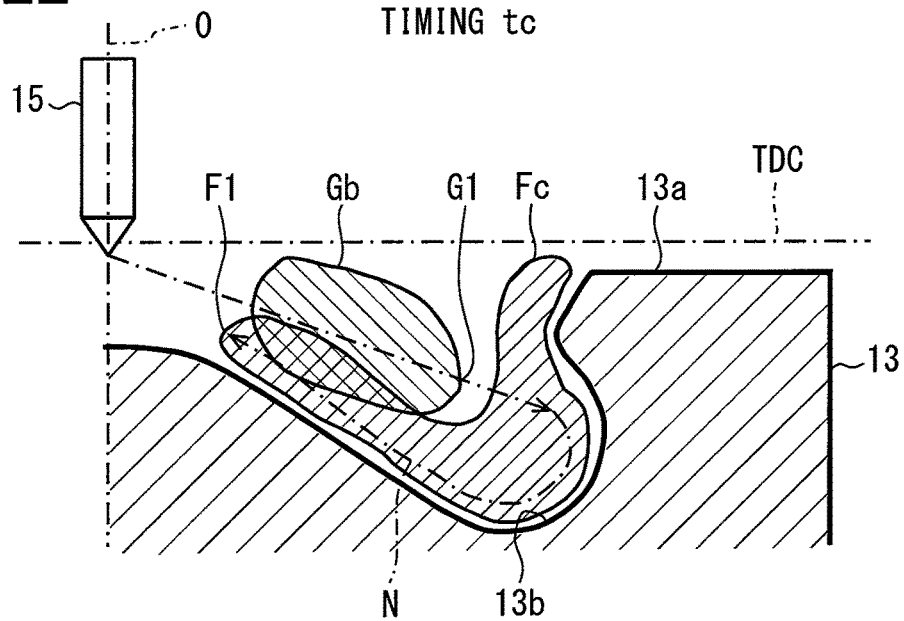
FIG. 22 is a diagram showing a position relation between a main spray component Fc and an after spray component Gb at a timing tc.

When the fuel is injected by the main injection, the main spray component F extends in a direction to separate from the fuel injection valve 15 along the straight-line axis part N1, and then the main spray component F returns towards the fuel injection valve 15 along the curved-line axis part N2 after being reflected at the inner peripheral surface of the cavity 13b (refer to FIGS. 21 and 22). The behavior of the main spray component F is influenced by the shape of the inner peripheral surface of the cavity 13b, the in-cylinder flow rate, the injection pressure, the injection amount, and the like.

The behavior of the main spray component F and the behavior of the after spray component G differ according to the shape of the cavity 13b, the in-cylinder environment, or the actual mixing ratio. For example, the momentum of the fuel after being injected from the fuel injection valve 15 increases in accordance with an increase in kinematic viscosity or an increase in density. It is more likely that an extension range of the main spray component Fa that reaches the inner peripheral surface of the cavity 13b becomes greater when the momentum becomes greater. Thus, it is more likely that the tip end part of the main spray component F and the tip end part of the after spray component G approaches the inner peripheral surface of the cavity 13b. In this case, the travel axis N is referred to as a travel axis Na. The travel axis Na is located at a position closer to the inner peripheral surface of the cavity 13b than the travel axis N is. When the travel axis N where the momentum of the fuel is small is referred to as a travel axis Nb. The travel axis Nb is located at a position farther from the inner peripheral surface of the cavity 13b than the travel axis N is.

In step S207, the travel axis N is set in a route through which it is assumed that the tip end part of the main spray component Fa passes, by considering the behavior of the main spray component Fa according to the shape of the cavity 13b.

In step S208, a representation position F1 of the main spray component Fa is acquired. In a direction where the main spray component Fa extends, the tip end part of the main spray component Fa existing on the travel axis N is referred to as the representation position F1. Thus, when the tip end part of the main spray component Fa exists on the travel axis N, the tip end part becomes the representation position F1. Step S208 corresponds to a main position acquisition unit.

In step S209, the smoke amount existing after the main combustion is estimated. Estimation of the smoke amount uses four injection parameters including the injection amount, the lower heat generation amount, the penetration, and the diffusion state, for the main injection. For example, the combustion region is estimated with the use of predetermined functions, maps, models, or the like on the injection amount, the lower heat generation amount, the penetration, and the diffusion state.

The smoke amount estimated in the present processing may include the smoke amount that is generated with the pilot injection. In this case, the smoke amount is estimated based on the injection amount, the lower heat generation amount, the penetration, and the diffusion state, for the pilot injection.

Returns to FIG. 7, after the main estimation processing, the process proceeds to step S106, and an after estimation processing is performed while the after injection is the target. The after estimation processing will be described referring to FIG. 19. The combustion of the fuel performed by the after injection is referred to as an after combustion, and a state of the after combustion is referred to as an after combustion state. Even in a case where a fuel has the same property (for example, the cetane number), when the mixing ratio of the molecular structural species contained in the fuel differs, the after combustion state differs. When the in-cylinder temperature increases while the after combustion is performed appropriately, it is likely that the smoke generated by the main combustion is oxidized, and the smoke that is oxidized combusts to increase the output of the internal combustion engine 10.

Figure 19:
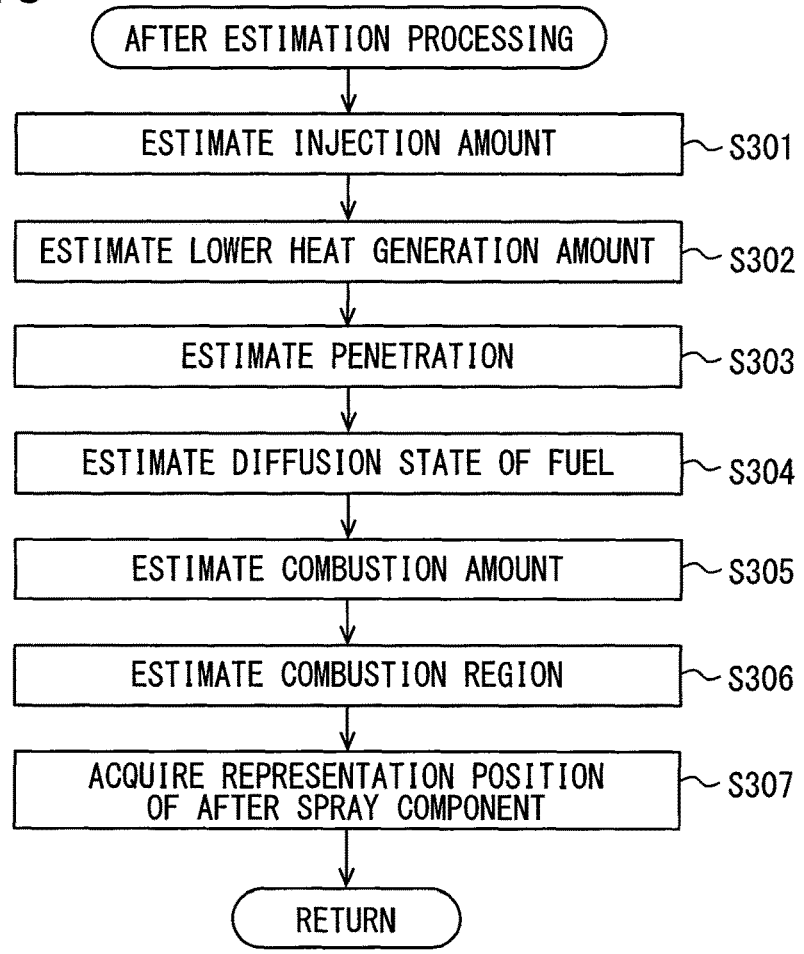
FIG. 19 is a flowchart showing a procedure of after estimation processing.

As shown in FIG. 19, in steps S301 to S304, the injection state of the after injection is estimated based on the actual mixing ratio. The injection parameter, which represents the injection state of the after injection, includes the injection amount, the lower heat generation amount, the penetration, and the diffusion state, which are four that is similar to the injection parameter of the main injection. For the reference fuel having the reference mixing ratio, the values of the respective injection parameters corresponding to the in-cylinder environment relating to the after injection are acquired in advance by conducting an experiment or the like, and those acquired data are stored in the memory 80b as reference data, similar to the main injection. For the actual fuel having the actual mixing ratio, the value of each injection parameter relating to the after injection is estimated with comparison with the reference data. Each injection parameter of the actual fuel may be estimated based on a deviation amount between the each injection parameter and the respective injection parameter of the reference fuel.

Alternatively, each injection parameter of the actual fuel may be estimated from the actual mixing ratio by directly calculating an absolute value.

In steps S301 to S304, each injection parameter of the after injection, similar to the estimation processings of the injection parameters of the main injection in steps S201 to S204. In this case, step S301 corresponds to an after injection amount estimation unit, step S302 corresponds to an after heat-generation amount estimation unit, step S303 corresponds to an after penetration force estimation unit, and step S304 corresponds to an after diffusion estimation unit.

In steps S305 and S306, the after combustion state is estimated with the use of the injection parameters estimated in steps S301 to S304. The combustion parameters indicating the combustion state include two parameters including the combustion amount and the combustion region, similar to the combustion parameters of the main combustion. In the reference fuel, the values of the respective combustion parameters corresponding to the in-cylinder environment relating to the after injection are acquired in advance by conducting an experiment or the like, and as with the injection parameters, those acquired data are stored in the memory 80b as the reference data. The actual fuel is compared with reference data relating to the after injection to estimate a value of each combustion parameter. Each injection parameter of the actual fuel may be estimated based on a deviation amount between the each injection parameter and the respective injection parameter of the reference fuel. Alternatively, each injection parameter of the actual fuel may be estimated from the actual mixing ratio by directly calculating an absolute value.

In steps S305 and S306, the combustion parameters for the after injection are estimated, similar to the estimation processings of the combustion parameters of the main injection in steps S205 and S206. Step S305 corresponds to an after combustion amount estimation unit, and step S306 corresponds to an after region estimation unit. The combustion amount of the after combustion is referred to as an after combustion amount, and the combustion region is referred to as an after combustion region.

At the timing of executing the after injection, similar to the timing of executing the main injection, it is unlikely that ignition delay is generated due to a condition that the in-cylinder temperature becomes sufficiently high. The spray component caused by the after injection is referred to as the after spray component G. The after spray component G almost defines the after combustion region. The shape and the position of the after spray component G are estimated while the after combustion region is estimated.

In step S307, a representation position G1 of the after spray component G is acquired. In a direction where the after spray component G extends, the tip end part of the after spray component G existing on the travel axis N is referred to as the representation position G1. Thus, when the tip end part of the after spray component G exists on the travel axis N, the tip end part becomes the representation position G1. Step S307 corresponds to an after position acquisition unit.

Returns to FIG. 7, after the after estimation processing, the process proceeds to step S107, and a separation distance between the main combustion region and the after combustion region is calculated as a combustion distance L1. Step S107 corresponds to a position acquisition unit that acquires a position correlation between the main combustion region and the after combustion region and corresponds to a distance acquisition unit that acquires the separation distance of the representation positions F1 and G1.

Figure 20:
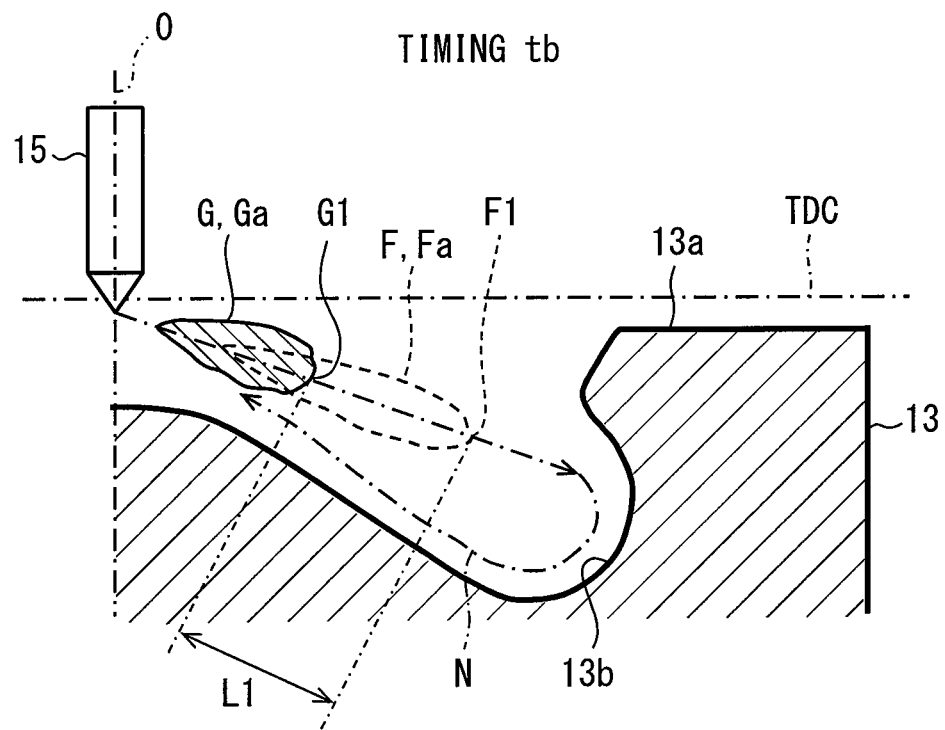
FIG. 20 is a diagram showing a position relation between a main spray component Fa and an after spray component Ga.

It is assumed that the main spray component Fa and the after spray component Ga exist at timings ta and tb, respectively. The timings ta and tb are timings that a predetermined period Δt has elapsed since the energization of the fuel injection valve 15 is terminated, for the main injection and the after injection. At the timing ta, the main spray component Fa exists as shown in FIG. 18. At the timing tb, the after spray component Ga exists as shown in FIG. 20. In this case, the timing tb is a timing after the timing ta (refer to FIG. 23), the timing ta is equivalent to a first timing, and the timing tb is equivalent to a second timing.

As shown in FIG. 20, a separation distance between the representation position F1 of the main spray component Fa and the representation position G1 of the after spray component Ga on the travel axis N is referred to as the combustion distance L1. The combustion distance L1 indicates the separation distance between the main combustion region and the after combustion region.

In step S108, it is determined whether the combustion distance L1 of the actual fuel is appropriate or not. Herein, data of the combustion distance according to an in-cylinder environment is beforehand acquired for the reference fuel through an experiment or the like, and the data is stored in the memory 80b. In the present example, the combustion distance of the reference fuel is read from the memory 80b, and "deviation" between the combustion distance of the reference fuel and the combustion distance L1 of the actual fuel is calculated as the difference. Thus, it is determined whether the difference is smaller than the reference distance. When the difference is not smaller than the reference distance, it is determined that the combustion distance L1 of the actual fuel is inappropriate, and the process proceeds to step S109.

At step S109, the adjustment process of the after combustion region is performed such that the difference of the combustion distance L1 becomes smaller than the reference distance. When the representation position G1 of the after spray component Ga of the actual fuel is closer to the representation position F1 of the main spray component Fa than the representation position G1 of the reference fuel is, a separation process to separate the representation position G1 from the representation position F1 in the travel axis N is performed. When the representation position G1 of the actual fuel is farther from the representation position F1 than the representation position G1 of the reference fuel is, an approach process to control the representation position G1 to approach the representation position F1 is performed. As for the separation process, processing to decrease the injection pressure to bring the representation position G1 of the after spray component Fb close to the fuel injection valve 15, and processing to adjust the timing of the after injection toward the TDC can be taken. As for the approach process, processing to increase the injection pressure to bring the representation position G1 of the after spray component Fb far from the fuel injection valve 15, and processing to adjust the timing of the after injection toward the BDC can be taken.

In the process of adjusting the after combustion region, the target value for reducing the difference of the combustion distance L to be smaller than the reference distance is set based on the actual mixing ratio. In that case, a provisional target value is acquired based on the reference mixing ratio, and the provisional target value is corrected with the use of the actual mixing ratio to calculate the target value. For example, in the process of decreasing the injection pressure, the provisional target value of the injection pressure is acquired with the use of the reference mixing ratio, and based on a difference of the combustion distance, and the provisional target value is corrected based on the actual mixing ratio to calculate the target value. In this way, a case, in which the injection amount is insufficient due to insufficiency of the actual mixing ratio, even though processing is implemented to increase the injection pressure, can be avoided.

The oxidation of the smoke caused by the after combustion will be described referring to FIGS. 21 to 24. As shown in FIG. 21, after both the main injection and the after injection are performed, at the timing tb that the after spray component Ga exists, the main spray component Fb exists since the fuel defining the main spray component Fa moves with time along the travel axis N. In the travel axis N, when a separation distance between the after spray component Ga and the main spray component Fb is referred to as a combustion distance L2, the combustion distance L2 is greater than the combustion distance L1.

As shown in FIG. 22, at the timing tc that a predetermined period has elapsed fine the timing tb (refer to FIG. 23), the fuels defining the main spray component Fb and the after spray component Ga move along the travel axis N to define a main spray component Fc and an after spray component Gb. At the timing tc, since the after spray component Ga defines the combustion region, the in-cylinder temperature increases, and it is likely that the smoke contained in the main spray component Fc is oxidized.

Figure 23:
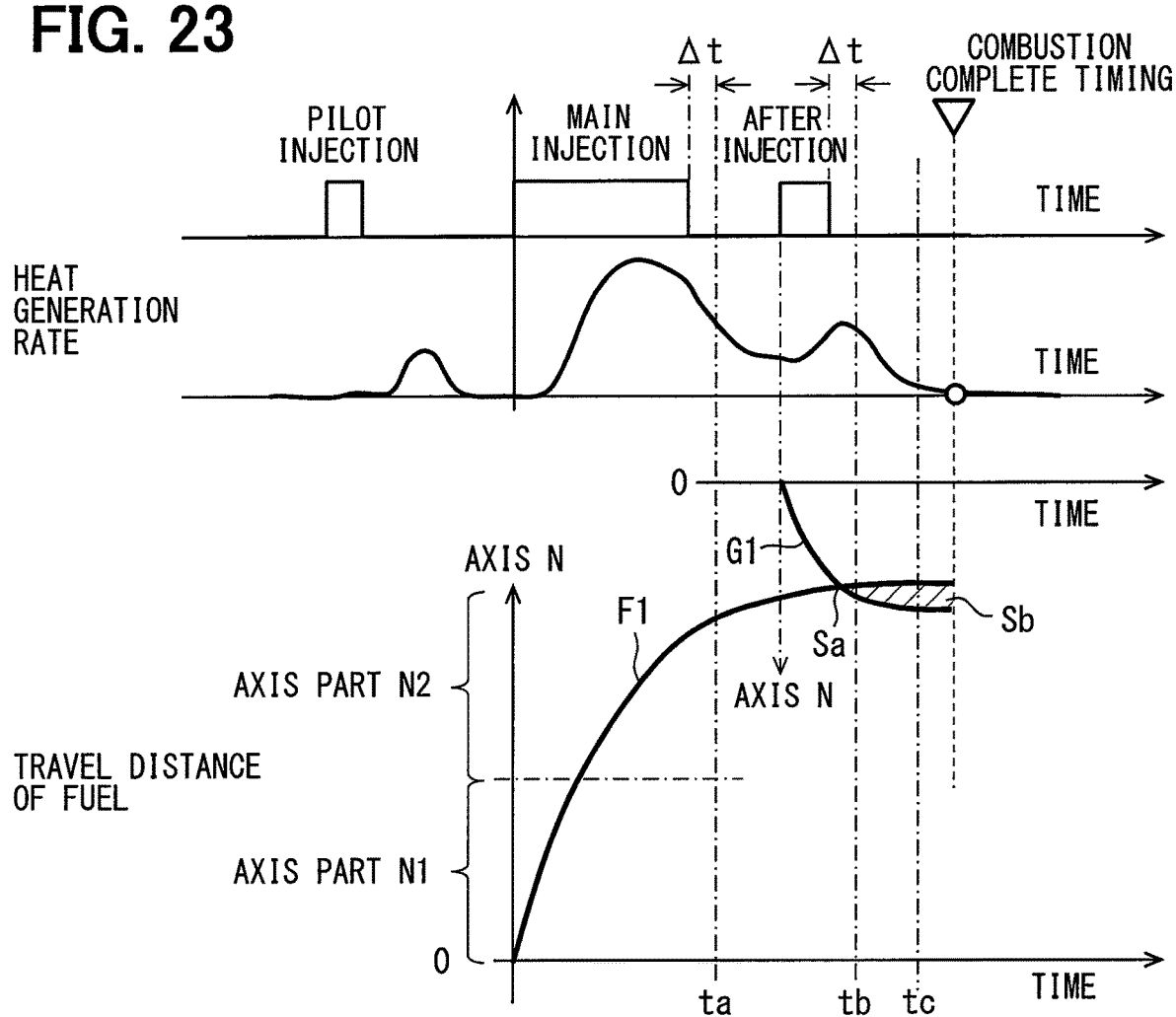
FIG. 23 is a diagram showing a correlation of a travel distance of a fuel between a main injection and an after injection.

As shown in FIG. 23, the heat generation rate increases every time that the pilot injection, the main injection or the after injection is performed, and the in-cylinder temperature increases in response to an execution of the pilot injection, the main injection or the after injection. The representation position F1 of the main spray component F and the representation position G1 of the after spray component G move with time along the travel axis N.

As shown in FIG. 23, the travel axis N directs upward for the representation position F1 of the main spray component F, and the travel axis N directs downward for the representation position G1 of the after spray component G. Lines indicating the travel distances of the representation positions F1 and G1 intersect each other between the timing tb and the timing tc. An intersection part Sa indicates that a position relation between the main spray component F and the after spray component G becomes a relation where the smoke in the combustion chamber 11a caused by the combustion of the after spray component G is likely to be oxidized. In this case, in a period from the intersection part Sa to the timing tc, an area between lines indicating the travel distances of the representation positions F1 and G1 is referred to as an oxidization index S.

Figure 24:
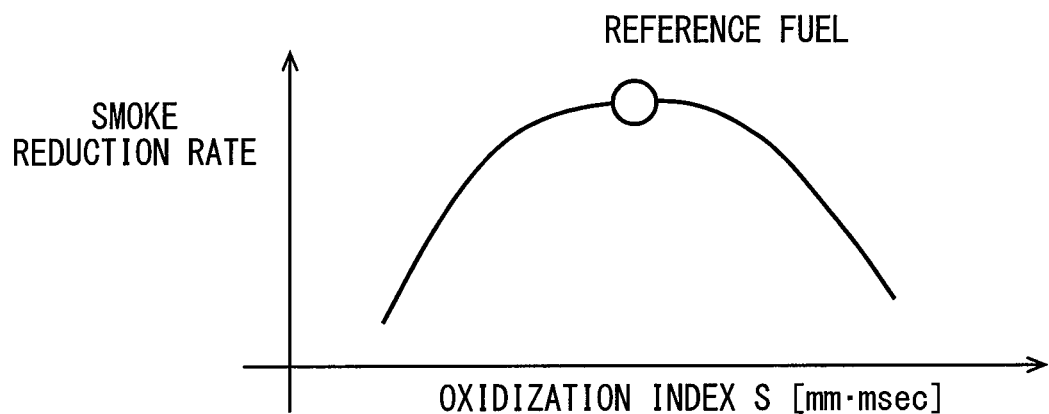
FIG. 24 is a diagram showing a relation between an oxygen index and a smoke reduction rate.

The oxidization index S is a value indicating an oxidization degree of the smoke caused by the after combustion. As shown in FIG. 24, when a degree of the smoke in the combustion chamber 11a reduced by the after combustion is referred to as a reduction rate, the smoke reduction rate reduces in a case where the oxidization index S is excessively large or is excessively small. For example, the oxidization index when the reference fuel is used becomes an oxidization index that the smoke reduction rate becomes largest.

Returning to FIG. 7, in step S110, the combustion amount of the reference fuel is read from the memory 80b, and a "deviation" between the combustion amount of the reference fuel and the combustion amount of the actual fuel is calculated as a difference. Thus, it is determined whether the difference is smaller than a reference amount that is previously set or not. The difference in this case is an absolute value of the difference between the combustion amount of the reference fuel and the combustion amount of the actual fuel.

In this case, the target value of the combustion amount caused by the after injection is set according to the smoke amount estimated in step S209 after the main combustion, and the determination reference of the difference is set according to the target value of the combustion amount. For example, the target value of the combustion amount is set to a value increasing in accordance with an increase in smoke amount. In this case, when the reference amount of the difference is set to a predetermined rate of the target value, the reference amount of the difference is set to a value increasing in accordance with an increase in target value.

When the difference in the combustion amount is not smaller than the reference amount, the process proceeds to step S111, and a process of adjusting the after combustion amount is performed so that the difference becomes smaller than the reference amount of the combustion amount. In this example, when the after combustion amount of the actual fuel is smaller than the after combustion amount of the reference fuel, an increasing process for increasing the after combustion amount is performed, and when the after combustion amount of the actual fuel is larger than the after combustion amount of the reference fuel, a decreasing process for decreasing the after combustion amount is performed. As for the increasing process, processing to increase the injection amount, processing to increase the injection pressure, processing to adjust the injection timing toward a top dead center TDC of the piston 13, and processing to decrease the EGR rate, for the after injection, can be taken. As for the decreasing process, processing to decrease the injection amount, processing to decrease the injection pressure, processing to adjust the injection timing toward the bottom dead center BDC of the piston 13, and processing to increase the EGR rate, for the after injection, can be taken.

In the process of adjusting the combustion amount, the target value, which is for reducing the difference of the combustion amount to be smaller than the reference amount, is set based on the actual mixing ratio. In that case, a provisional target value is acquired based on the reference mixing ratio, and the provisional target value is corrected with the use of the actual mixing ratio to calculate the target value. For example, in the process of increasing the injection amount, the provisional target value of the injection amount is acquired with the use of the reference mixing ratio, and based on the difference of the combustion amount, and the provisional target value is corrected based on the actual mixing ratio to calculate the target value. As a result, the issue that the injection amount is insufficient due to the actual mixing ratio although the process of increasing the injection amount has been performed is restricted.

Steps S109 and S111 correspond to a combustion control unit.

In this example, the pilot injection performed while the in-cylinder temperature is rising, the main injection, the after-injection, and the post injection performed while the in-cylinder temperature is decreasing are performed in the stated order in one combustion cycle. The in-cylinder oxygen concentration is largest at a timing when the pilot injection is performed, decreases in the order of the main injection and the after-injection, and is smallest at a timing when the post injection is performed.

The in-cylinder temperature is lowest at a timing when the pilot injection is performed after intake starts, and rises to a sufficiently high temperature at a timing when the main injection and the after-injection are performed. Thereafter, the in-cylinder temperature decreases with an increase in a cylinder capacity in an expansion stroke of the piston, and becomes an intermediate temperature higher than the temperature at the timing when the pilot injection is performed, at the timing when the post injection is performed. In the combustion chamber 11a, for example, a low temperature range is set to 900K or lower, a medium temperature range is set to 900K to 1100K, and a high temperature range is set to 1100K or higher.

In one combustion cycle, chemical combustion is started by oxidation of combustible molecules such as ketone and aldehyde, with the generation of the OH radicals caused by the injection of the fuel. Examples of reactions for generating the OH radicals include a decomposition reaction, in which hydrogen peroxide $H_2O_2$ produced from inert $HO_2$ radicals and alkene is decomposed into the OH radicals, and a chain branching reaction in which the generation and consumption of the OH radicals are repeated in a process where oxygen is given to hydrocarbons to produce combustible molecules. In the chain branching reaction, the generation amount and the consumption amount of the OH radicals are almost identical with each other. Estimation of the components contributing to the OH radicals is synonymous with the estimation of the generation amount of the combustible molecules.

Each molecular structural species of the fuel contains a produced molecule that is likely to produce the OH radicals in a process of a chain branching reaction and an inhibitor molecule that is unlikely to produce the OH radicals. The produced molecules include linear paraffins, and inhibitor molecules include aromatics. In the fuel, in not only the chain branching reaction but also any reactions, the ease of ignition varies depending on the density distribution between the produced molecule and the inhibitor molecule. However, when the decomposition of $H_2O_2$ is excessive in the high temperature range, the ignition timing varies depending on the generation state of the OH radicals and fluid turbulence inside and outside the spray. The density distribution between the produced molecule and the inhibitor molecule affects the generation position of the OH radical distribution produced by the chain branching reaction along a time series, and the mode of occurrence of the chain branching reaction is correlated with the fuel component.

Figure 25:
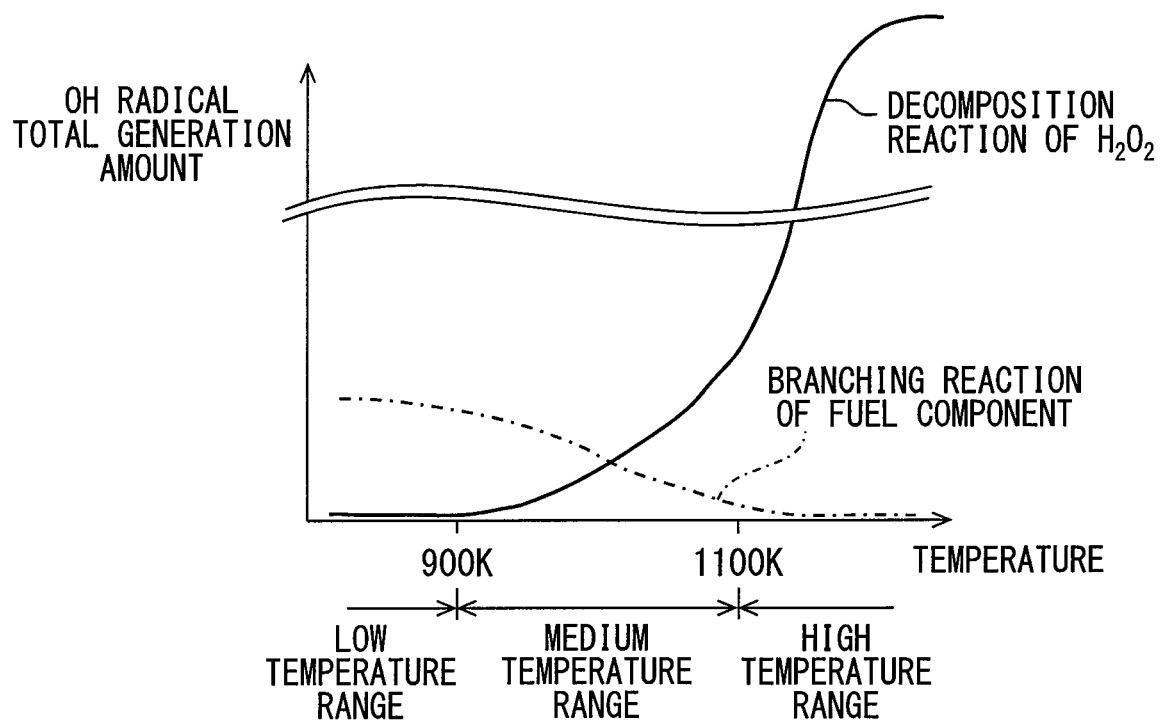
FIG. 25 is a diagram illustrating a generation amount of OH radicals.

Ease of ignition caused by the injection of the fuel varies depending on which temperature range, to which the in-cylinder temperature belongs at that time. As shown in FIG. 25, in the low temperature range where the in-cylinder temperature is 900K or lower, $H_2O_2$ is hardly decomposed, and the generation amount of the OH radical caused by the decomposition reaction of $H_2O_2$ is very small. On the other hand, among the fuel components, the chain branching reactions caused by the components capable of extracting hydrogen by intramolecular isomerization and having a structure with a small strain energy are likely to occur, and the generation amount of the OH radicals involved in the chain branching reaction is relatively increased. In that case, a large number of produced molecules tend to cause the chain branching reaction, and the decomposition reaction of $H_2O_2$ hardly occurs.

To this issue, the inventors have acquired knowledge that the degree of dependence of the ignition timing on the fuel component is high in the low temperature range which is the temperature range where the pilot injection is performed. In this case, as compared with a case, in which $H_2O_2$ is forcibly decomposed into combustible molecules such as ketone and aldehyde with 1 to 3 carbon atoms (C1 to C3) due to the OH radical production and β cleavage accompanying the decomposition of $H_2O_2$ at the high temperature to perform ignition, the ignition delay tends to occur depending on the actual mixing ratio.

As the in-cylinder temperature rises from the low temperature range, the amount of OH radicals generated by the chain branching reaction gradually decreases, and the amount of OH radicals produced by the decomposition reaction of $H_2O_2$ abruptly increases.

For example, in the medium temperature range where the in-cylinder temperature is 900K to 1100K, although $H_2O_2$ tends to be decomposed, the amount of OH radicals generated by the decomposition reaction of $H_2O_2$ does not increase sharply even though the temperature rises. In that case, the amount of OH radicals produced by the decomposition reaction of $H_2O_2$ is larger than the OH radicals generated by the chain branching reaction by the fuel component. Before a structure with small strain energy causing the chain branching reaction is formed, the number of molecules having a number of carbon atoms of 1 to 3 increases, and the chain branching reaction gradually decreases.

To this issue, the present inventors have acquired knowledge that an ignition delay, which depends on molecules produced as a fuel component causing the chain branching reaction, and an ignition delay, which is caused by the decomposition reaction of $H_2O_2$ having no sensitivity in a fuel component such as the produced molecule, are required to be taken into consideration for the ignition timing in the medium temperature range which is a temperature range where the post injection is performed. For that reason, in the medium temperature range, the dependence of the ignition timing on the fuel component is lower than that in the low temperature range where the pilot injection is performed, and the post injection is less likely to cause the ignition delay than the pilot injection depending on the actual mixing ratio.

Also, in a high temperature range where the in-cylinder temperature is 1100K or higher, $H_2O_2$ is likely to decompose, and the amount of OH radicals generated by the decomposition reaction of $H_2O_2$ abruptly increases as the temperature rises. On the other hand, the number of molecules causing the chain branching reaction by the fuel component decreases, and the amount of OH radicals generated by the chain branching reaction is very small. To this issue, the present inventors have acquired knowledge that the ignition timing is hardly influenced by the chemical combustion of the fuel in the high temperature range where the main injection and the after-injection are performed. For that reason, depending on the actual mixing ratio, the main injection and the after-injection are less likely to cause the ignition delay than the post injection.

As follows, operational effects of the first embodiment described above will be described.

According to the first embodiment, the main combustion region of the actual fuel and the after combustion region of the actual fuel are individually estimated based on the actual mixing ratio. Thus, when the main combustion region and the after combustion region are differently influenced by the actual mixing ratio due to a case where the in-cylinder environment and the like differ in the main injection and the after injection, a relative position relation of the combustion regions can be managed appropriately. In this case, it can be restricted that the after combustion is incompletely performed to increase a generation amount of the smoke while the main combustion region and the after combustion region are close to each other and that an oxidization rate of the smoke caused by the after combustion decreases while the main combustion region and the after combustion region are far from each other. Thus, when any fuel having various properties is used, the exhaust emission caused by the after injection and the output of the internal combustion engine 10 can be adjusted.

According to the first embodiment, the main combustion state and the after combustion state are estimated by using four injection parameters including the injection amount, the lower heat generation amount, the penetration, and the diffusion state, for the main injection and the after injection. In this case, for example, as compared with the configuration where the main combustion state is directly estimated with the use of the function, the map, or the model for the actual mixing ratio, the degree of dependence of the estimation result on the functions, the maps, and the models can be lowered, and the difficulty of creating the functions, the maps and the models can be lowered. Thus, the estimation precision of the main combustion state and the after combustion state can be improved.

According to the first embodiment, the processes for adjusting the after combustion region and the after combustion amount are performed based on the actual mixing ratio. Thus, it can be restricted that a situation, in which the combustion distance L and "deviation" of the combustion amount do not fall within the reference distance, and the reference amount, respectively, even though the processes are performed, occurs. Thus, with the use of the actual mixing ratio, high estimation precision can be effectively leveraged for controlling the internal combustion engine 10 for the main injection and the after injection in a configuration in which the estimation precision of the combustion amount and the combustion region is enhanced.

According to the first embodiment, since the travel axis N is set as a coordinate axis of the fuel coordinate system based on the actual mixing ratio, acquisition precision of the representation positions F1 and G1 can be improved comparing a configuration where one coordinate axis is set without respect to the actual mixing ratio. Since the travel axis N is set such that the tip end parts of the main spray component F and the after spray component G become the representation positions F1 and G1, relative positions of spray components that are the main spray component F and the after spray component G can be substantially identical.

According to the first embodiment, since the representation position F1 of the main spray component F and the representation position G1 of the after spray component G are individually acquired, the relative position relation between the main combustion region and the after combustion region can be quantized. Thus, a processing load can be reduced while the position relation of the combustion regions is managed.

According to the first embodiment, at the timings to and tb that the predetermined period Δt has elapsed from the main injection and the after injection, the representation position F1 of the main spray component Fa and the representation position G1 of the after spray component Ga are acquired. In this case, since the representation positions F1 and G1 are acquired at a stage where influences applied to the main injection and the after injection from the in-cylinder environment are remarkably small, the acquisition precision can be improved. For example, in a configuration where both the representation position F1 and the representation position G1 are acquired at the timing tb, it is assumed that the main spray component Fb is likely to be influenced by the in-cylinder environment including the in-cylinder flow rate or the like at the timing tb, and the acquisition precision of the representation position F1 of the main spray component Fb is likely to be lowered.

Second Embodiment

According to the first embodiment, the representation positions F1 and G1 are acquired by using respective combustion regions for the main injection and the after injection. According to a second embodiment, the representation positions F1 and G1 are acquired by using respective penetrations and respective diffusion states. The after control processing of the present embodiment will be described referring to flowcharts of FIGS. 26 to 28.

Figure 26:
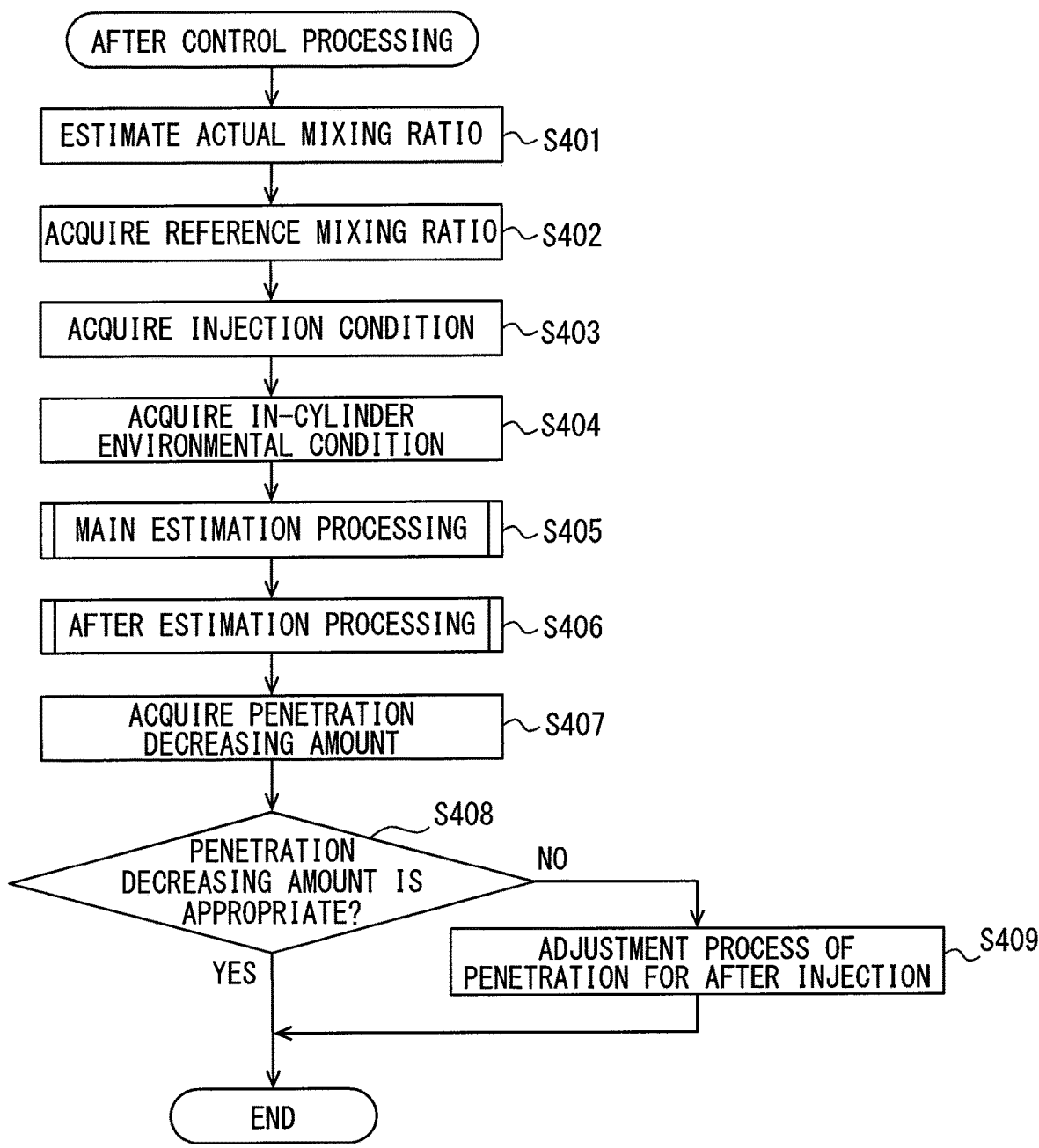
FIG. 26 is a flowchart showing a procedure of after control process according to a second embodiment.

In FIG. 26, in steps S401 to S406, the same processing as steps S101 to S106 of the first embodiment is performed. However, the main estimation processing of step S405 and the after estimation processing of step S406 do not execute the estimation of two combustion parameters including the combustion amount and the combustion region. Step S401 corresponds to the mixing acquisition unit.

Figure 27:
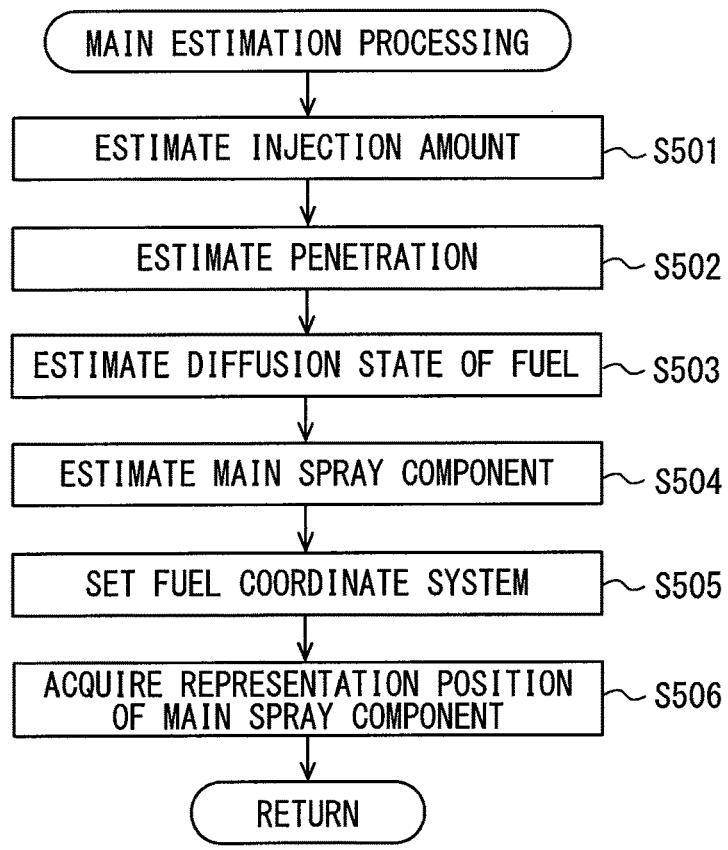
FIG. 27 is a flowchart showing a procedure of main estimation processing.

For the main estimation processing, in FIG. 27, the same processing as steps S201, S203, and S204 in the first embodiment is executed in steps S501 to S503. Step S502 corresponds to a penetration force estimation unit that estimates the penetration for the main injection.

In step S504, the shape and the position of the main spray component F are estimated based on the injection amount, the penetration, and the diffusion state, for the main injection. For example, the main spray component F is estimated with the use of predetermined functions, maps, models, or the like on the injection amount, the penetration, and the diffusion state. In this case, the shapes and the positions of the main spray component F in at least timings ta, tb, and tc are estimated. Further, the main spray component F may be estimated by using at least one of the injection amount, the penetration, or the diffusion state.

In steps S505 and S506, the same processing as steps S207 and S208 in the first embodiment is performed. Step S506 corresponds to a main position acquisition unit that acquires the representation position F1 of the main spray component F.

Figure 28:
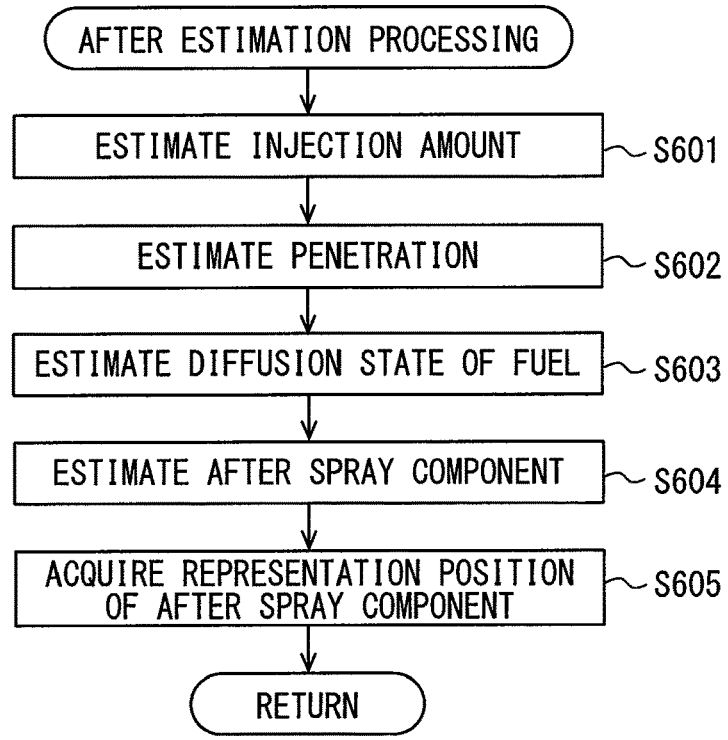
FIG. 28 is a flowchart showing a procedure of the after estimation processing.

For the after estimation processing, in FIG. 28, the same processing as steps S301, S303, and S304 in the first embodiment is executed in steps S601 to S603. Step S602 corresponds to the penetration force estimation unit that estimates the penetration for the after injection.

In step S604, the position and the shape of the after spray component G are estimated based on the injection amount, the penetration, and the diffusion state, for the after injection. For example, the after spray component G is estimated with the use of predetermined functions, maps, models, or the like on the injection amount, the penetration, and the diffusion state. In this case, the shapes and the positions of the after spray component G in at least timings tb and tc are estimated. Further, the after spray component G may be estimated by using at least one of the injection amount, the penetration, or the diffusion state, similar to the main spray component F.

In step S605, the same processing as step S307 in the first embodiment is performed. Step S605 corresponds to an after position acquisition unit that acquires the representation position G1 of the after spray component G.

Return to FIG. 26, after the after estimation processing, in step S407, a difference between the penetration of the main injection and the penetration of the after injection is acquired as a penetration decreasing amount where the main injection is a reference.

In step S408, it is determined whether the penetration decreasing amount is appropriate or not. Herein, data of the penetration decreasing amount according to an in-cylinder environment is beforehand acquired for the reference fuel through an experiment or the like, and the data is stored in the memory 80b. In the present example, the penetration decreasing amount of the reference fuel is read from the memory 80b, and "deviation" between the penetration decreasing amount of the reference fuel and the penetration decreasing amount of the actual fuel is calculated as the difference. Thus, it is determined whether the difference is smaller than the reference amount. When the difference is not smaller than the reference amount, it is determined that the penetration decreasing amount of the actual fuel is inappropriate, and the process proceeds to step S409.

In step S409, the adjustment process for the penetration of the after injection is performed such that the difference of the penetration decreasing amount becomes smaller than the reference amount. When the penetration decreasing amount of the actual fuel is greater than the penetration decreasing amount of the reference fuel, processing, which is to decrease the injection amount, processing, which is to increase the number of the injection stages of a fuel, processing, which is to decrease the injection pressure, and the like are performed. In this case, it is unlikely that the fuel of the after injection enters the main combustion region, and it is restricted that the fuel of the after injection is incompletely combusted. Thus, the exhaust emission is adjusted.

To the contrary, when the penetration decreasing amount of the actual fuel is smaller than the penetration decreasing amount of the reference fuel, processing, which is to increase the injection amount, processing, which is to decrease the number of the injection stages of a fuel, processing, which is to increase the injection pressure, and the like are performed. In this case, it is likely that the fuel of the after injection approaches the main combustion region, and the oxidization of the smoke caused by the main combustion is promoted. Thus, the output of the internal combustion engine 10 increases appropriately.

According to the second embodiment, the penetration of the main injection and the penetration of the after injection are estimated based on the actual mixing ratio. Thus, when the penetrations of the main injection and the after injection are differently influenced by the actual mixing ratio due to a case where the in-cylinder environment and the like differ in the main injection and the after injection, a relative relation of the penetrations can be managed appropriately. In this case, similar to the first embodiment, it can be restricted that the generation amount of the smoke caused by the after injection increases and that the oxidization rate of the smoke caused by the after injection decreases.

Other Embodiments

The disclosure is not at all limited to the preferred embodiments of the disclosure described above and can be implemented in various modified forms as exemplified below. Not only combination between the elements explicitly specified in each of the embodiments to be capable of being combined with each other but also partial combination between the embodiments can be conducted even without explicit expression insofar as the combination is not particularly hindered.

As a modification 1, the mixing ratio estimation unit 82 may not estimate the mixing ratio of the molecular structural species based on the multiple combustion characteristic values, but may detect the general property of the fuel with a sensor, and estimate the mixing ratio based on the detection result. Specific examples of the above general properties include a fuel density, a kinematic viscosity, a distillation temperature, and the like.

Further, the mixing ratio may be estimated based on both of the estimation result with the mixing ratio estimation unit 82 and the detection result of the sensor. For example, the mixing ratio estimated based on one of the estimation result and the detection result may be corrected based on the other. In addition, the mixing ratio may be estimated with different methods depending on the molecular structural species. For example, the mixing ratio of the first molecular structural species is estimated based on the estimation result of the mixing ratio estimation unit 82, and the mixing ratio of the second molecular structural species is estimated based on the detection result of the sensor.

As a modification 2, instead of estimating the mixing ratio of the molecular structural species contained in the fuel, a mixing ratio of components such as hydrogen, carbon, sulfur, nitrogen, and oxygen contained in the fuel may be estimated. For example, an average number of carbon atoms, an average number of hydrogen atoms, an HC ratio which is the ratio of the number of hydrogen atoms to the number of carbon atoms, and the like can be taken as the mixing ratio for hydrogen and carbon. In the present configuration, injection parameters such as the injection amount and combustion parameters such as the combustion amount are estimated based on the mixing ratio of various components. In this way, even in a case where components contained in the actual fuel differ from each other or where the mixing ratio of the components differ, the combustion state caused by the main injection and the after injection in present cycle can be estimated appropriately. The fuel component such as the average number of carbon atoms can also be referred to as an intermediate parameter.

As a modification 3, the adjustment process of step S109 and the like in the first embodiment, and the adjustment process of step S409 and the like in the second embodiment, may be performed without respect to the actual mixing ratio. For example, a configuration may be employed in which the target injection pressure and the like to adjust the combustion region are set without respect to the actual mixing ratio in step S109, after the combustion region is estimated based on the actual mixing ratio in steps S206 and S306, in the first embodiment.

As a modification 4, the combustion parameter including the combustion amount and the like may be estimated by using at least one of four injection parameters including the combustion amount and the like, for the main injection and the after injection. For example, the combustion region is estimated based on only the penetration. Even in that case, a certain level of estimation precision in estimating the combustion region can be ensured due to the issue that the four injection parameters are correlated with each other.

As a modification 5, in the post combustion, the lower heat generation amount may not be used as the injection parameter, but the higher heat generation amount may be used as the injection parameter. In addition, the heat generation amount including both of the lower heat generation amount and the higher heat generation amount may be used as the injection parameter.

As a modification 6, the injection parameters such as the injection amount and the combustion parameters such as the combustion amount may not be estimated, individually, for each of the actual mixing ratio and the reference mixing ratio. For example, a difference between the actual mixing ratio and the reference mixing ratio is calculated, and a difference between the injection parameter and the combustion parameter is estimated based on the calculated difference. In that case, the "deviation" between the combustion state of the reference fuel and the combustion state of the actual fuel is directly estimated.

As a modification 7, the combustion parameter including the combustion amount and the like may be estimated without using the injection parameter including the injection amount and the like in the first embodiment. For example, the combustion amount is not estimated based on the injection parameter, but is estimated based on the detection signal of the in-cylinder pressure sensor 21 and the actual mixing ratio. Even in that case, the actual mixing ratio of the fuel can be reflected in the estimation of the combustion amount.

As a modification 8, the ignition delay characteristic may be estimated as the injection parameter in the main estimation processing or the after estimation processing. The ignition delay characteristic is a characteristic indicating tendency of the ignition. For example, the ignition delay characteristic is expressed by a time required for the ignition of the fuel to start in a state where the in-cylinder environment promotes the ignition. Examples of a state in which the in-cylinder environment promotes the ignition include a state in which the in-cylinder temperature and the in-cylinder pressure are sufficiently high for generation of the ignition, and the like. In this case, for example, the combustion amount or the combustion rate may be estimated based on the penetration, the diffusion state, and the ignition delay characteristic.

As a modification 9, the injection regions of the fuel may be estimated based on the actual mixing ratio, for the main injection and the after injection, in the second embodiment. For example, in the main estimation processing and the after estimation processing, the penetrations and the diffusion states are estimated, and the injection regions are estimated based on the penetrations and the diffusion states, for the main injection and the after injection. In the after control processing, "deviation" between the injection region of the actual and the injection region of the reference fuel is calculated as the difference, and the adjustment process is performed to adjust the injection region based on the difference.

As a modification 10, the representation positions F1 and G1 may be intermediate positions or base end parts of the spray components F and G without being the tip end parts of the spray components F and G. Specifically, when a direction orthogonally crossing the travel axis N is referred to as a width direction of the spray components F and G, center positions of the spray components F and G in the width direction are referred to as the representation positions F1 and G1. It is assumed that the center positions of the spray components F and G in the width direction is likely to vary according to the actual mixing ratio or the in-cylinder environment. Thus, in a configuration where the center positions of the spray components F and G in the width direction are referred to as the representation positions F1 and G1, the estimation precision of the representation positions F1 and G1 can be maintained appropriately, by setting the travel axis N based on the actual mixing ratio.

As a modification 11, the combustion coordinate system may be set without respect to the actual mixing ratio. For example, the travel axis N is set based on an extending direction of the injection hole and a shape of the inner peripheral surface of the cavity 13b. It is assumed that the positions of the tip end parts of the spray components F and G are unlikely to vary even though the actual mixing ratio or the in-cylinder environment varies. Thus, in a configuration where the positions of the tip end parts of the spray components F and G are referred to as the representation positions F1 and G1, it is unlikely that the acquisition precision of the representation positions F1 and G1 decreases even though the travel axis N is set without respect to the actual mixing ratio.

As a modification 12, the representation positions F1 and G1 may be set to different positions for the spray components F and G. For example, the tip end part is referred to as the representation position F1 for the main spray component F, and the base end part is referred to as the representation position G1 for the after spray component G. In this case, the position relation between the spray components F and G can be acquired by calculating the separation distance between the representation positions F1 and G1.

As a modification 13, in the first embodiment, the adjustment process of the after combustion region may be performed based on the combustion distance L2 without being performed based on the combustion distance L1. In other words, the representation positions F1 and G1 are compared with each other for the spray components Fb and Gb at the same timing tb, without being compared with each other for the spray components Fa and Ga at different timings such as the timings ta and tb. In this case, the position relation between the main spray component F and the after spray component G is acquired by using the representation positions F1 and G1.

As a modification 14, a property sensor for detecting a general property of a fuel may be provided. For example, a fuel tank or a common rail is provided with the property sensor for detecting a kinematic viscosity and a density of the fuel. In this configuration, the average number of carbon atoms and the average number of hydrogen atoms of the fuel may be estimated based on the detection result of the property sensor.

As a modification 15, the in-cylinder temperature may be estimated based on the in-cylinder pressure detected with the in-cylinder pressure sensor 21, instead of being detected with the temperature detection element 21a. More specifically, the in-cylinder temperature is calculated according to the in-cylinder pressure, the cylinder capacity, a gas weight in the cylinder, and a gas constant for estimation.

As a modification 16, the unit and/or the function produced with the ECU 80 as the estimation device and the control device of the combustion system can be produced with software stored in a substantive storage medium and a computer executing the software, with software alone, with hardware alone, or with a combination of the software and the hardware. In a case where the combustion system control device is produced with a hardware circuit, for example, it can be produced with an analog circuit or a digital circuit including multiple logic circuits.

The estimation device 80 according to the first disclosure described above is applicable to the combustion system including the internal combustion engine 10. The estimation device 80 includes the mixing acquisition unit S101, S401, the main region estimation unit S206, and the after region estimation unit S306. The mixing acquisition unit S101, S401 acquires a mixing ratio of various components contained in a fuel used for combustion in the internal combustion engine. The main region estimation unit S206 estimates a combustion region of the fuel as a main combustion region for a main combustion produced by injecting the fuel into a combustion chamber 11a of the internal combustion engine by a main injection, based on the mixing ratio acquired by the mixing acquisition unit. The after region estimation unit S306 estimates an injection region of the fuel as the after combustion region based on the mixing ratio, for an after combustion produced by injecting the fuel into the combustion chamber by an after injection, after the main injection in one combustion cycle.

According to the first disclosure, since the main combustion region and the after combustion region are estimated, a position relation between the main combustion region and the after combustion region can be obtained. In this case, since a relative position of the after combustion region relating to the main combustion region can be managed appropriately, it can be restricted that the generation amount of the smoke caused by the fuel of the after injection increases and the combustion amount of the fuel of the main injection decreases.

Further, both the main combustion region and the after combustion region are estimated based on the mixing ratio of various components contained in the fuel. Thus, even in a case where components contained in the fuel differ from each other or where the mixing ratio of the components differ, the relative position of the after combustion region relating to the main combustion region can be managed accurately. Thus, when any fuel having various properties is used, the exhaust emission caused by the after injection and the output of the internal combustion engine can be adjusted.

The estimation device 80 according to the second disclosure described above is applicable to the combustion system including the internal combustion engine 10. The estimation device 80 includes a mixing acquisition unit S401, a main penetration force estimation unit S502, and an after penetration force estimation unit S602. The mixing acquisition unit S401 acquires a mixing ratio of various components contained in a fuel used for combustion in the internal combustion engine. The main penetration force estimation unit S502 estimates a penetration force of the fuel injected into a combustion chamber 11a of the internal combustion engine by a main injection, based on the mixing ratio acquired by the mixing acquisition unit. The after penetration force estimation unit S602 estimates a penetration force of the fuel injected into the combustion chamber by the after injection, based on the mixing ratio, after the main injection in one combustion cycle.

According to the second disclosure, since the penetration forces of the fuel for the main injection and the after injection are estimated, a position relation between the main spray component caused by the main injection and the after spray component caused by the after injection can be obtained when the fuel diffuses into spray shapes in the main injection and the after injection. In this case, since a relative position of the after spray component relating to the main spray component can be managed appropriately, it can be restricted that the generation amount of the smoke caused by the fuel of the after injection increases and the combustion amount of the fuel of the main injection decreases.

Further, the penetration forces for the main injection and the after injection are estimated based on the mixing ratio of various components. Thus, even in a case where components contained in the fuel differ from each other or where the mixing ratio of the components differ, the relative position of the after spray component relating to the main spray component can be managed accurately. Thus, when any fuel having various properties is used, the exhaust emission caused by the after injection and the output of the internal combustion engine can be adjusted.

The control device 80 according to the third disclosure described above is applicable to the combustion system including the internal combustion engine 10. The control device 80 includes a mixing acquisition unit S101, S401, a main region estimation unit S206, an after region estimation unit S306, and a combustion control unit S109, S111, and S409. The mixing acquisition unit S101, S401 acquires a mixing ratio of various components contained in a fuel used for combustion in the internal combustion engine. The main region estimation unit S206 estimates a combustion region of the fuel as a main combustion region for a main combustion produced by injecting the fuel into a combustion chamber 11a of the internal combustion engine by a main injection, based on the mixing ratio acquired by the mixing acquisition unit. The after region estimation unit S306 estimates an injection region of the fuel as the after combustion region based on the mixing ratio, for an after combustion produced by injecting the fuel into the combustion chamber by an after injection, after the main injection in one combustion cycle. The combustion control unit S109, S111, and S409 controls the combustion system based on the respective estimation results of the main region estimation unit and the after region estimation unit.

According to the third disclosure, the same advantages as those in the first disclosure can be obtained.

The present disclosure has been described with reference to the examples, but the present disclosure is not limited to the examples or the structures. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. A combustion system, comprising:
   an internal combustion engine including at least one fuel injector;
   at least one sensor configured to detect a combustion characteristic value or a fuel characteristic value; and
   a controller coupled to the sensor and the at least one fuel injector, the controller including a processor and a memory storing program instructions that when executed by the processor, cause the processor to:
   estimate, based on the combustion characteristic value or the fuel characteristic value detected by at least the one sensor, a mixing ratio of various components contained in the fuel used for combustion in the internal combustion engine;
   estimate, based on the mixing ratio, a main combustion region corresponding to a combustion region of the fuel for a main combustion produced by injecting the fuel into a combustion chamber of the internal combustion engine during a main injection;
   estimate, based on the mixing ratio, an after combustion region corresponding to an injection region of the fuel for an after combustion produced by injecting the fuel into the combustion chamber during an after injection, the main injection and the after injection being defined as being performed during a same combustion cycle, the after injection being performed after the main injection; and
   control at least an injection pressure of the at least one fuel injector based on a comparison between the estimated main combustion region and the estimated after combustion region.

2. The combustion system according to claim 1,
   wherein the memory has stored thereon further program instructions that when executed by the processor, cause the processor to:

estimate an injection amount caused by the main injection, based on the mixing ratio, estimate a heat generation amount of the fuel caused by the main combustion, based on the mixing ratio, estimate a penetration force of the fuel caused by the main injection, based on the mixing ratio, or estimate a diffusion state of the fuel caused by the main injection, based on the mixing ratio, and estimate the main combustion region based on least one of the injection amount, the heat generation amount, the penetration force, or the diffusion state, for the main injection.

3. The combustion system according to claim 1, wherein the memory has stored thereon further program instructions that when executed by the processor, cause the processor to:

estimate an injection amount caused by the after injection, based on the mixing ratio, estimate a heat generation amount of the fuel caused by the after combustion, based on the mixing ratio, estimate a penetration force of the fuel caused by the after injection, based on the mixing ratio, or estimate a diffusion state of the fuel caused by the after injection, based on the mixing ratio, and estimate the after combustion region based on at least one of the injection amount, the heat generation amount, the penetration force, or the diffusion state, for the after injection.

4. The combustion system according to claim 1, wherein the memory has stored thereon further program instructions that when executed by the processor, cause the processor to:

set a fuel coordinate system for acquiring positions of the main combustion region and the after combustion region, based on the mixing ratio;

acquire a predetermined representation position of the main combustion region for the fuel coordinate system; and acquire a predetermined representation position of the after combustion region for the fuel coordinate system.

5. The combustion system according to claim 4, wherein the memory has stored thereon further program instructions that when executed by the processor, cause the processor to:

acquire a separation distance between (i) the representation position of the main combustion region and (ii) the representation position of the after combustion region in the fuel coordinate system, and control at least the injection pressure of the at least one injector based on the separation distance.

6. The combustion system according to claim 4, wherein the memory has stored thereon further program instructions that when executed by the processor, cause the processor to:

acquire the representation position of the main combustion region at a first timing upon a predetermined time elapsing since a start of the main injection, the predetermined time being previously set, and acquire the representation position of the after combustion region at a second timing upon the predetermined time elapsing since a start of the after injection.

7. The combustion system according to claim 1, further comprising a plurality of sensors configured to detect the combustion characteristic value or the fuel characteristic value.

8. The combustion system according to claim 7, wherein the plurality of sensors include any of an in-cylinder pressure sensor, an oxygen concentration sensor, a rail pressure sensor, a crank angle sensor, and an accelerator pedal sensor.

9. The combustion system according to claim 8, wherein the plurality of sensors further include any of an exhaust gas temperature sensor, an exhaust gas pressure sensor, and a catalyst temperature sensor.

* * * * *